United States Patent
Hu et al.

(10) Patent No.: US 12,406,239 B2
(45) Date of Patent: Sep. 2, 2025

(54) METHODS AND SYSTEMS FOR REDUCING CROSS-BORDER TRAFFIC OVER A NETWORK

(71) Applicant: MASTERCARD INTERNATIONAL INCORPORATED, Purchase, NY (US)

(72) Inventors: Zhenni Hu, O'Fallon, MO (US); Ke Zhou, Chesterfield, MO (US); Saritha Tirunagari, Chesterfield, MO (US); Gregory Marifian, Belleville, IL (US)

(73) Assignee: MASTERCARD INTERNATIONAL INCORPORATED, Purcahse, NY (US)

( * ) Notice: Subject to any disclaimer, the term of this patent is extended or adjusted under 35 U.S.C. 154(b) by 45 days.

(21) Appl. No.: 18/412,214

(22) Filed: Jan. 12, 2024

(65) Prior Publication Data
US 2024/0152891 A1    May 9, 2024

Related U.S. Application Data

(63) Continuation of application No. 16/228,009, filed on Dec. 20, 2018, now abandoned.

(51) Int. Cl.
*G06Q 20/10* (2012.01)
*G06F 16/25* (2019.01)
*G06Q 20/08* (2012.01)

(52) U.S. Cl.
CPC ......... *G06Q 20/108* (2013.01); *G06F 16/252* (2019.01); *G06Q 20/085* (2013.01)

(58) Field of Classification Search
CPC .... G06Q 20/108; G06Q 20/085; G06Q 20/10; G06Q 20/405; G06Q 20/381; G06F 16/252

(Continued)

(56) References Cited

U.S. PATENT DOCUMENTS 6,772,131 B1 * 8/2004 Francis .................. G06Q 10/10
                                                              705/42
7,269,575 B1    9/2007 Concannon
(Continued)

FOREIGN PATENT DOCUMENTS

WO    WO-2008094904 A1 *  8/2008 ............. G06Q 20/10

OTHER PUBLICATIONS

A Survey of Payment Card Industry Data Security Standard, IEEE (Year: 2010).*

(Continued)

*Primary Examiner* — Bruce I Ebersman
(74) *Attorney, Agent, or Firm* — Armstrong Teasdale LLP

(57) ABSTRACT

A convertor computing device operable to reduce cross-border traffic over a network is provided. The convertor computing device is configured to store institution profile data associated with an institution and user profile data for a plurality of users associated with the institution. The convertor computing device is also configured to generate, based on the user profile data, sets of transfer data, each set identifying a recipient, associated recipient country, and transfer amount from a user. The convertor computing device is also configured to aggregate individual transfer amounts into a batch transfer amount based on matching recipient country, transfer the batch transfer amount in a single cross-border transaction from an institution account to a batch receiver in the matching country, and generate an instruction data file that instructs the batch receiver to distribute the individual transfer amounts to the associated recipients within the matching country.

20 Claims, 10 Drawing Sheets

(58) Field of Classification Search
USPC .......................................................... 705/42
See application file for complete search history.

(56) References Cited

U.S. PATENT DOCUMENTS

| | | | |
|---|---|---|---|
| 8,539,040 B2 | 9/2013 | Luna | |
| 8,626,653 B1 | 1/2014 | Krikorian | |
| 9,065,978 B2* | 6/2015 | Deas | G06Q 20/40145 |
| 2002/0032642 A1 | 3/2002 | Chichilnisky | |
| 2003/0177092 A1* | 9/2003 | Paglin | G06Q 20/108 |
| | | | 705/42 |
| 2005/0021454 A1 | 1/2005 | Karpovich | |
| 2006/0149671 A1* | 7/2006 | Nix | G06Q 20/24 |
| | | | 705/40 |
| 2011/0077919 A1 | 3/2011 | Lee | |
| 2011/0077949 A1* | 3/2011 | Olliphant | G06Q 20/10 |
| | | | 705/30 |
| 2011/0282780 A1 | 11/2011 | French | |
| 2015/0149356 A1 | 5/2015 | Feldman | |
| 2015/0317842 A1* | 11/2015 | Evans | G06Q 20/325 |
| | | | 705/13 |
| 2016/0189117 A1* | 6/2016 | Sandraz | G06Q 20/027 |
| | | | 705/16 |
| 2016/0224964 A1* | 8/2016 | Vergari | G06Q 40/02 |
| 2016/0247134 A1* | 8/2016 | Kimberg | G06Q 20/4037 |

OTHER PUBLICATIONS

Is Credit Card Fraud a Real Crime? Does it Really Cripple the E-Commerce Sector of E-Business?, IEEE (Year: 2008).*
Managing Bandwidth and Traffic via Bundling and Filtration in Large-Scale Distributed Simulations. Roberto Sanchez. Theses and Dissertations. Air Force Institute of Technology. 2006. (Year: 2006).

* cited by examiner

STATUS 500    802

| 06/15/2017 (Period End: 06/15/2017) |||||||||
|---|---|---|---|---|---|---|---|---|
| Date | Receiver Name | Destination Country | Receiver Account Number | Amount | Currency Type | Transaction Fee (USD) | Status | Receipt |
| 6/17/2017 | Tom Jerry | China | 0000000093821213 | 1,000 | USD | 3 | ■ success | |

| 06/15/2017 (Period End: 06/15/2017) |||||||||
|---|---|---|---|---|---|---|---|---|
| Date | Receiver Name | Destination Country | Receiver Account Number | Amount | Currency Type | Transaction Fee (USD) | Status | Receipt |
| 6/17/2017 | Tom Jerry | China | 0000000093821213 | 1,000 | USD | 3 | ■ success | |

View Full History

METHODS AND SYSTEMS FOR REDUCING CROSS-BORDER TRAFFIC OVER A NETWORK

CROSS REFERENCE TO RELATED APPLICATIONS

This application is a continuation of and claims priority to U.S. application Ser. No. 16/228,009 filed on Dec. 20, 2018, the disclosure and contents of which are hereby incorporated by reference in their entirety.

BACKGROUND

The field of the disclosure relates generally to systems and methods for electronically bundling data over a network and, more particularly, to network-based systems and methods for reducing cross-border traffic over a network.

Many individuals receive a paycheck in one country and remit at least a portion of that income to individuals and/or businesses in another country. Moreover, many individuals perform such remittances via an electronic transfer of funds. The use of one transfer message for every remittance increases traffic within computer networks, and particularly within payment processing networks. For example, cross-border message traffic on payment processing networks increases substantially on common pay dates, such as near the end of each month and bi-weekly. Moreover, the large number of such individual transmissions increases a difficulty of detecting and tracing fraudulent use of payment accounts and a difficulty for payment processing networks in tracking unauthorized cross-border transactions. In addition, the sending of individual transmissions increases transmission costs incurred by users. These inefficiencies discourage transfers across borders and across disparate currencies. Furthermore, individuals initiating such transfers often do not receive relevant information. For example, individuals are not informed, in advance of the transfer, the total amount of fees (e.g., hidden fees) that each transfer incurs and/or the actual amount (e.g., amount after fees are deducted and the funds have been exchanged to the recipient's local currency) that the recipient of the funds is going to receive.

Accordingly, a system is needed that reduces, and improves a predictability of, cross-border transfer traffic on payment processing networks associated with common pay dates and enables simplified, transparent, and low-cost cross border transfer processing for the individuals making such transfers. Moreover, a system is needed that adds cost predictability, transmission tracking, and detailed remittance data that can be associated with each transmission to reduce and track security data breaches.

BRIEF DESCRIPTION

In one embodiment, a convertor computing device operable to reduce cross-border traffic over a network is provided. The convertor computing device is communicatively coupled to a database and is configured to store institution profile data associated with an institution in the database, wherein the institution profile data identifies institution account data, a batch receiver, and a batch receiver country associated with the batch receiver, and wherein the batch receiver country differs from an institution country associated with the institution account data. The convertor computing device is also configured to store user profile data in the database for a plurality of users associated with the institution in the institution country, wherein the user profile data identifies a plurality of recipients and, for each of the recipients, a recipient bank, a recipient account, an individual transfer amount from one of the users, and a recipient country, wherein the recipient country differs from the institution country. The convertor computing device is further configured to generate, based on the user profile data in the database, sets of transfer data, wherein each of the sets of transfer data identifies one of the recipients, the associated recipient country of the recipient, and the associated individual transfer amount from the one of the users. The convertor computing device is also configured to aggregate the individual transfer amounts of a subset of the sets of transfer data into a batch transfer amount, wherein the sets of transfer data in the subset include the recipient country matching the batch receiver country. The convertor computing device is further configured to transfer, via a payment processing network associated with the convertor computing device, the batch transfer amount from an institution account identified by the institution account data to the batch receiver. The convertor computing device is also configured to generate an instruction data file that instructs the batch receiver to distribute the individual transfer amounts associated with the subset to the associated recipients, wherein each of the distributions is instructed to occur within the matching batch receiver country. The convertor computing device is further configured to transmit the instruction data file to the batch receiver.

In another embodiment, a computer-implemented method for reducing cross-border traffic over a network is provided. The method is implemented by a convertor computing device that includes at least one processor in communication with a database. The method includes storing institution profile data associated with an institution in the database, wherein the institution profile data identifies institution account data, a batch receiver, and a batch receiver country associated with the batch receiver, and wherein the batch receiver country differs from an institution country associated with the institution account data. The method also includes storing user profile data in the database for a plurality of users associated with the institution in the institution country, wherein the user profile data identifies a plurality of recipients and, for each of the recipients, a recipient bank, a recipient account, an individual transfer amount from one of the users, and a recipient country, wherein the recipient country differs from the institution country. The method further includes generating, based on the user profile data in the database, sets of transfer data, wherein each of the sets of transfer data identifies one of the recipients, the associated recipient country of the recipient, and the associated individual transfer amount from the one of the users. The method also includes aggregating the individual transfer amounts of a subset of the sets of transfer data into a batch transfer amount, wherein the sets of transfer data in the subset include the recipient country matching the batch receiver country. The method further includes transferring, via a payment processing network associated with the convertor computing device, the batch transfer amount from an institution account identified by the institution account data to the batch receiver. The method also includes generating an instruction data file that instructs the batch receiver to distribute the individual transfer amounts associated with the subset to the associated recipients, wherein each of the distributions is instructed to occur within the matching batch receiver country. The method further includes transmitting the instruction data file to the batch receiver.

In yet another embodiment, a non-transitory computer readable medium that includes computer-executable instructions embodied thereon is provided. When the computer-executable instructions are executed by a convertor computing device that includes at least one processor in communication with a database, the computer-executable instructions cause the convertor computing device to store institution profile data associated with an institution in the database, wherein the institution profile data identifies institution account data, a batch receiver, and a batch receiver country associated with the batch receiver, and wherein the batch receiver country differs from an institution country associated with the institution account data. The computer-executable instructions also cause the convertor computing device to store user profile data in the database for a plurality of users associated with the institution in the institution country, wherein the user profile data identifies a plurality of recipients and, for each of the recipients, a recipient bank, a recipient account, an individual transfer amount from one of the users, and a recipient country, wherein the recipient country differs from the institution country. The computer-executable instructions further cause the convertor computing device to generate, based on the user profile data in the database, sets of transfer data, wherein each of the sets of transfer data identifies one of the recipients, the associated recipient country of the recipient, and the associated individual transfer amount from the one of the users. The computer-executable instructions also cause the convertor computing device to aggregate the individual transfer amounts of a subset of the sets of transfer data into a batch transfer amount, wherein the sets of transfer data in the subset include the recipient country matching the batch receiver country. The computer-executable instructions further cause the convertor computing device to transfer, via a payment processing network associated with the convertor computing device, the batch transfer amount from an institution account identified by the institution account data to the batch receiver. The computer-executable instructions also cause the convertor computing device to generate an instruction data file that instructs the batch receiver to distribute the individual transfer amounts associated with the subset to the associated recipients, wherein each of the distributions is instructed to occur within the matching batch receiver country. The computer-executable instructions further cause the convertor computing device to transmit the instruction data file to the batch receiver.

BRIEF DESCRIPTION OF THE DRAWINGS

FIGS. 1-10 show example embodiments of the methods and systems described herein.

FIG. 1 is a simplified block diagram of an example convertor system used for bundling data over a network, including a convertor computing device.

FIG. 2 is a schematic diagram illustrating an example multi-party transfer processing system that may be implemented using the convertor computing device shown in FIG. 1.

FIG. 3 illustrates an example configuration of a user system that may be used to implement at least one client device of the convertor system shown in FIG. 1.

FIG. 4 illustrates an example configuration of a server system, including the convertor computing device, of the convertor system shown in FIG. 1.

FIG. 5 is a schematic diagram illustrating an example home screen of a graphical user interface (GUI) that may be implemented by the convertor system shown in FIG. 1 for enrolling a user into a convertor service.

FIG. 6 is a schematic diagram illustrating an example user registration screen of the GUI of FIG. 5.

FIG. 7 is a schematic diagram illustrating an example account management screen of the GUI of FIG. 5.

FIG. 8 is a schematic diagram illustrating an example summary screen of the GUI of FIG. 5.

FIG. 9 is an example flow diagram illustrating a method for reducing cross-border traffic over a network shown in FIG. 1.

FIG. 10 is a diagram of components of one or more example computing devices that may be used to implement the convertor system shown in FIG. 1.

DETAILED DESCRIPTION

Figure 1:
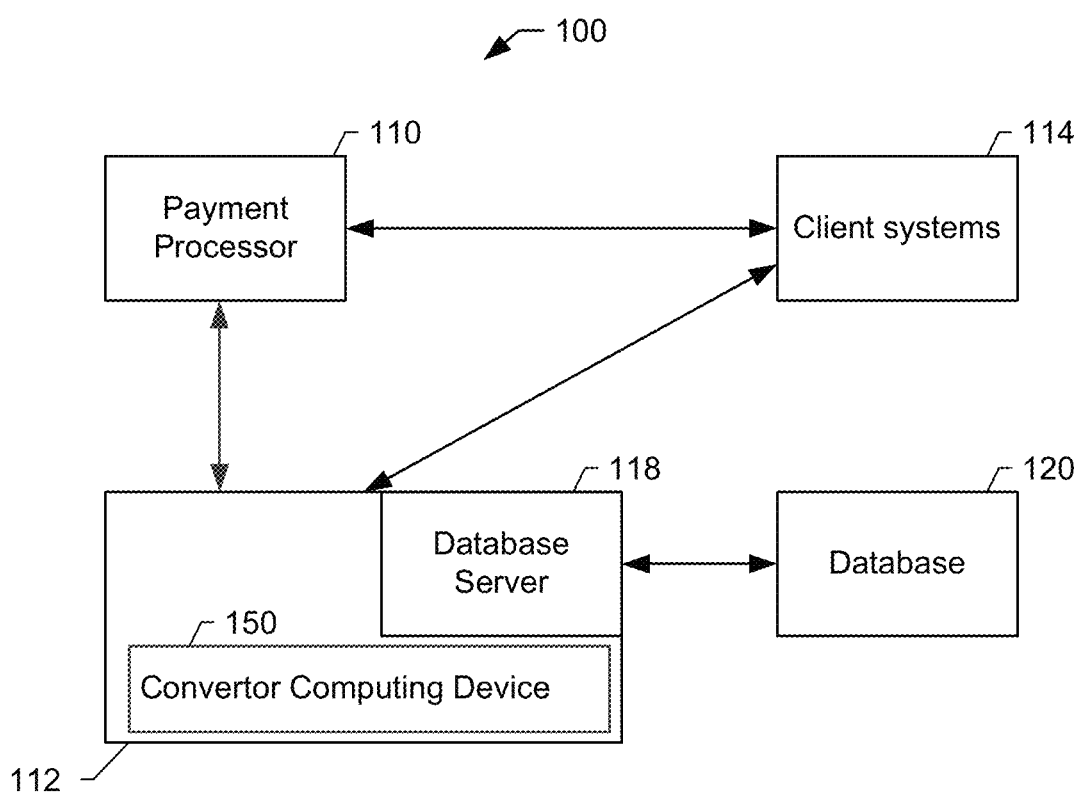

The following detailed description illustrates embodiments of the disclosure by way of example and not by way of limitation. The description clearly enables one skilled in the art to make and use the disclosure, and describes several embodiments, adaptations, variations, alternatives, and uses of the disclosure, including what is presently believed to be the best mode of carrying out the disclosure. The disclosure described herein is applied to an example embodiment, namely, methods and systems for utilizing a convertor system for reducing cross-border traffic over a network. More specifically, the convertor system provides a convertor service that reduces cross-border traffic over the network by bundling and unbundling data for recurring cross-border payment transactions. For example, the convertor service enables users enrolled in the service (e.g., employees and/or consumers of a business that has subscribed to the convertor service) to securely transfer funds between financial institutions located in different regions, such as countries. The convertor system described herein includes at least one convertor computing device.

The convertor computing device includes at least one processor and at least one memory device communicatively coupled to the processor. The memory device stores computer instructions that, when executed by the processor, causes the processor to function as described herein. The convertor system also includes a database and a database server communicatively coupled to the convertor computing device. The database and the database server may also be referred to as central database. The term "central database" may be used interchangeably to refer to the database or the database server. The database and the database server may be separate from each other, and in at least some embodiments, the database and the database server are in communication with the convertor computing device over different communication networks in a distributed architecture. The database and database server are configured to store data, such as institution profile data of an institution (e.g., an employer) that defines domestic and foreign accounts for funding batch transfers to other countries, user profile data of users associated with the institution (e.g., employees of the employer) that defines individual transfers to recipients in the other countries, and other data that may be required for the convertor system to function as described herein. Notably, the recipients need not have any relationship with the institution itself. For example, the recipients may be family members of a user or holders of student loans of a user.

In the example embodiment, the user profile data may include, among other user data, a user identifier, user authentication credentials (e.g., username, password, biometric data, security questions, security answers, or the like), user account data (e.g. an identifier of a payment card account associated with the user, such as a primary account number (PAN), or a virtual account number or tokenized identifier associated with the PAN), a user computing device identifier, a remittance amount selected by the user (e.g., a selected percentage of, or currency amount from, a regular paycheck), a remittance timing selected by the user (e.g., monthly, contemporaneous with every paycheck, contemporaneous with every third paycheck), a recipient identifier (e.g., a recipient may be an individual or an entity, such as a financial institution, receiving the transfer), a recipient account identifier (e.g., an identifier of a payment card account associated with the recipient, such as a primary account number (PAN), or a virtual account number or tokenized identifier associated with the PAN), a recipient country code, and/or other data associated with the user and/or the transfer to the intended recipient.

In the example embodiment, sets of transfer data may be generated by the convertor computing device from the user profile data and/or retrieved from other data sources in the database or from additional user input. Each set of transfer data defines an individual transfer (e.g., transfer of funds) initiated by the convertor computing device based on the user profile data. The transfer data may include, among other data, the user identifier, the user account data, the user computing device identifier, an origin code (e.g., a code identifying the country where the user's paycheck is deposited), an identifier of an issuing bank associated with the user account data, an issuer computing device identifier associated with the user's issuing bank, a transfer amount, a time and date of the transaction, data descriptive of the transfer (e.g., a description of the reason for the transfer), the recipient account identifier, a recipient bank identifier (e.g., international swift code, routing number, or the like), a recipient bank computing device identifier associated with the recipient bank, a destination code (e.g., the recipient country code), and/or other data associated with the transfer to the intended recipient. As described herein, a recipient may be also referred to as a receiver.

In the example embodiment, the institution profile data may include, among other data, an institution identifier (e.g., an employer offering bundled transfers to its employees), institution authentication credentials (e.g., username, password, biometric data of authorized agents of the institution, security questions, security answers, or the like), institution account data (e.g. an identifier of a payment card account associated with the employer in an originating country, such as a primary account number (PAN), or a virtual account number or tokenized identifier associated with the PAN), an institution computing device identifier, at least one batch receiver identifier (e.g., an identifier of an entity, such as a financial institution, designated to receive bundled transfers from the institution in each receiving country), at least one corresponding batch receiver account number (e.g., an identifier of a payment card account associated with the corresponding batch receiver institution, such as a primary account number (PAN), or a virtual account number or tokenized identifier associated with the PAN), a country identifier of the batch receiver, and/or other data associated with the originating account used by the institution to send bundled transfers to the corresponding batch receivers in each receiving country and/or the batch receiver account designated in each receiving country to receive the bundled transfers.

In the example embodiment, batch data may be generated by the convertor computing device from the institution profile data and the transfer data, and/or retrieved from other data sources in the database or from additional institutional agent input. Each set of batch data may include the institution identifier, the institution account data, the institution computing device identifier, an identifier of an issuing bank associated with the institution account data, an institution issuer computing device identifier associated with the institution's issuing bank, a transaction amount aggregated from the transfer amounts of the individual transfers to be bundled, a time and date of the batch transaction, data descriptive of the batch transfer, the batch receiver account identifier, a batch receiver identifier (e.g., bank identifier), a batch receiver computing device identifier associated with the batch receiver, the destination code (e.g., a country code associated with the destination country), other information to be included in an authorization request message (e.g., ISO® 8583 compliant messages and ISO® 20022 compliant messages) associated with the bundled transaction, and/or other data associated with the bundled transfer to the intended batch receiver in each particular receiving country.

In some embodiments, user profile data, transfer data, institution profile data, and/or batch data are anonymized and aggregated (e.g., by the user computing device) prior to receipt by the convertor computing device (i.e., no personally identifiable information (PII) is received by the convertor computing device). In other embodiments, the convertor computing device may be configured to receive user profile data, transfer data, institution profile data, and/or batch data not yet being anonymized and/or aggregated, and thus the convertor computing device may be configured to anonymize and aggregate the user profile data, transfer data, institution profile data, and/or batch data. In such embodiments, any PII received by the convertor computing device is received and processed in an encrypted format, or is received with the consent of individuals with which the PII is associated. In situations in which the systems discussed herein collect personal information about individuals including users, or may make use of such personal information, individuals may be provided with an opportunity to control whether such information is collected or to control whether and/or how such information is used. In addition, certain data may be processed in one or more ways before it is stored or used, so that personally identifiable information is removed.

In the example embodiment, the convertor computing device is in communication with multiple data sources that may include, but are not limited to, a payment processor that is part of a payment processing network, and at least one client system (e.g., a user computing device, an issuer computing device, an institution computing device, a batch receiver computing device, and a recipient bank computing device) or any other computing device able to communicate with the convertor computing device, and at least one application program interface (API). The at least one client system may include a web-enabled phone (e.g., a "smartphone"), a personal digital assistant (PDA), a desktop computer, a laptop computer, a cellular phone, a tablet, a phablet, or other web-based connectable equipment the user may use to communicate with the convertor computing device.

In the example embodiment, the convertor computing device is configured to receive the institution profile data from at least one institution computing device at the time of institution enrollment in the convertor service. Once the convertor computing device enrolls an institution (e.g., an employer) in the convertor service, the convertor computing device is configured to receive enrollments from individual users associated with the institution (e.g., employees of the employer desiring to transfer a portion of their paychecks to another country). For example, the institution notifies eligible individual users that the convertor service is available through the individuals' association with the institution. In some embodiments, the convertor computing device enrolls an employer in the convertor service, stores the institution profile data within the database in communication with the convertor computing device, and provides to the employer, for display to employees on an employer intranet site and/or for forwarding to employees via email, for example, a link to an employee enrollment interface provided by the convertor computing device.

The convertor computing device is further configured to receive user profile data for each individual that elects to register for the convertor service. More specifically, the convertor computing device is configured to store the user profile data for each registered individual within the database, and to generate batch transfers from a domestic financial account of the institution to respective batch receiver accounts located in different countries, based on the aggregated transfer amounts selected by the registered individuals remitting payments to each country. For example, a group of employees wishes to send remittance payments from their country of employment to their separate accounts in a different country, and the convertor system enables the individual transfers to be bundled in a single cross-border transaction, thereby avoiding multiple individual transactions that would more heavily load the resources of the payment processing network and that would result in relatively high individual transfer fees for each employee.

In the example embodiment, the convertor computing device instructs the institution to withhold the individual transfer amounts selected by each user, along with the associated transaction fees, from the user's paycheck according to the remittance timing selected by the user in the user profile data. The institution then uses the withheld amounts to fund the batch transfer. In other embodiments, rather than withholding the individual transfer amounts from the user's paycheck, the convertor service initiates individual transfers from a user account to the institution account via the payment processing network to fund the batch transfer. For example, the convertor computing device is in communication with at least one issuer computing device using the payment processing network. The communication between the convertor computing device and the at least one issuer computing device may be a direct communication or via a payment processing network. For example, in some embodiments, during the process of enrolling a user, the convertor computing device is configured to send user profile data, such as the user account data and selected remittance amount, to the user's issuing bank to verify the validity of the user account data submitted by the user.

Additionally or alternatively, during the process of sending a bundled transfer, the convertor computing device is configured to send the transfer data for each individual transfer that is to be bundled to the respective issuing bank of the user. In some such embodiments, the convertor computing device sends an authorization request message (e.g., ISO® 8583 compliant messages and ISO® 20022 compliant messages) including the transfer data to the associated issuer computing device. In response, the convertor computing device receives from the respective issuer computing device an authorization response message confirming, for example, that a PAN associated with the user account data has sufficient funds or credit to fund the user's selected transfer amount. Therefore, the convertor computing device may prevent users with insufficient funds or credit at the time of the batch transfer from participating in the batch transfer. The convertor computing device may include in the authorization request message an indication that the individual transfer by the user is not to be completed, or otherwise notify the issuer (e.g., after the authorization response message is received) that the individual user transaction is not to be completed. Thus, the convertor computing device ensures that the individual transfers by each user are not submitted as separate transactions across the border.

Moreover, during the process of sending a bundled transfer, the convertor computing device is configured to send the institution account data and the aggregated transaction amount to the institution's issuing bank. In some such embodiments, the convertor computing device sends an authorization request message (e.g., ISO® 8583 compliant messages and/or ISO® 20022 compliant message) including the batch transaction data to the associated issuer computing device. In response, the convertor computing device receives from the corresponding issuer computing device an authorization response message confirming, for example, that a PAN associated with the institution account data has sufficient funds or credit to fund the batch transfer amount. The batch transfer to the corresponding batch receiver account may then be completed.

The convertor computing device is further configured to automatically generate transfer data and perform the batch transactions on a predefined schedule. For example, the convertor computing device may be configured to automatically process batch transfers at or just after the end of an employer's pay period, such as every first or last day of each month, bi-weekly, or weekly. Alternatively, the predefined schedule is any other suitable schedule. In alternative embodiments, an operator instructs the convertor computing device as to the timing of each bundled transfer process.

In some embodiments, the convertor computing device is configured to automatically bundle transfers to each of a plurality of destinations. More specifically, in some embodiments, the user profile data stored in the database for the plurality of employees contains a number of different recipient country codes. For example, a first group of U.S.-based employees may want to transfer funds to accounts in India, a second group of U.S.-based employees may want to transfer funds to accounts in China, and a third group of U.S.-based employees may want to transfer funds to accounts in Zambia. As defined by the predefined schedule, for example at the end of a pay period, the convertor computing device retrieves user profile data, assembles a set of transfer data for each employee for the current pay period based on the user profile data, and assigns a unique transfer identifier to each transfer. The convertor computing device parses the transfer data associated with each employee, identifies each recipient country code, and bundles the transfers into a plurality of "batches" in which each set of transfer data shares a common recipient country code. After accumulating the transfers into "batches" associated with each recipient country code, the convertor computing device performs transfers for each group of employees using a single payment transaction from the institution account in the institution country to the respective batch receiver account in the corresponding recipient country. The use of bundling substantially reduces cross-border traffic in the payment network (e.g. at or just after the end of each month or weekly pay period, when remittances from paychecks are most numerous), increases a speed of processing recurring cross-border transactions, enables setting a fixed fee reduced pricing structure for the "batch," reduces potential for data security breaches in the obviated user cross-border transfers, and mitigates money laundering practices.

In the example embodiment, as discussed above, the convertor computing device is configured to accumulate the individual transfers into batches based on a common destination country (e.g., a common recipient country code). In other embodiments, the convertor computing device is configured to accumulate the individual transfers into batches based on more specific common parameter among the transfers, such as a common recipient bank identifier (e.g., same financial institution), a common recipient identifier (e.g., same mortgage company, same loan company, or the like). In still other embodiments, the convertor computing device is configured to accumulate the individual transfers into batches based on a common recipient commerce zone or foreign trade zone (e.g., European Union, Eurasian Economic Union, etc.). For convenience, batch transfers to such commerce/foreign trade zones will also be referred to as batch transfers to specific "countries."

The convertor computing device is also configured to electronically instruct the batch receiver computing device to automatically disburse the batch payment transaction amount among the respective recipient accounts associated with the bundled transfers. The instructions sent by the convertor computing device include, for example, the recipient bank identifier, the recipient bank computing device identifier, the recipient account identifier, the transfer amount, and/or other data from each set of bundled transfer data in the batch to enable the batch receiver computing device to redirect the aggregated batch transfer amount to the recipient bank computing devices associated with each bundled individual transfer. In the example embodiment, the transfers from the batch receiver to the individual recipient accounts also occur via the payment processing network as implemented in the destination country or zone. Once the recipient bank computing device receives the payment transaction from the batch receiver, the amount of funds in the PAN of the recipient, for example, is increased by the transfer amount as originally indicated in the transfer data. However, these "unbundling" or distribution transactions occur solely within the destination country, and thus do not generate cross-border traffic on the payment processing network. Alternatively, the unbundling transactions are accomplished using any suitable transfer method.

A technical effect of the systems and processes described herein includes at least one of: (a) bundling data for multiple users for cross-border transfers to a common destination country or trade zone; (b) accumulating individual transfers into batches based on commonalities among the recipient destinations of a plurality of transfers; (c) enabling users associated with an institution (e.g., employees of an employer) to make recurring cross-border transfers based on a single enrollment, thus increasing a speed of processing recurring cross-border transactions; (d) processing and transmitting the batch transfer across a border in a single payment transaction; (e) decreasing cross-border traffic in the payment network, especially during peak usage times (e.g. on or just after pay dates); (f) processing a plurality of individual transfers in a single parse (e.g., analysis) of registered user data, thereby increasing a speed of processing cross-border transactions; and (g) redirecting an aggregated transaction amount to the respective recipient banks and recipient accounts in the receiving country.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Figure 2:
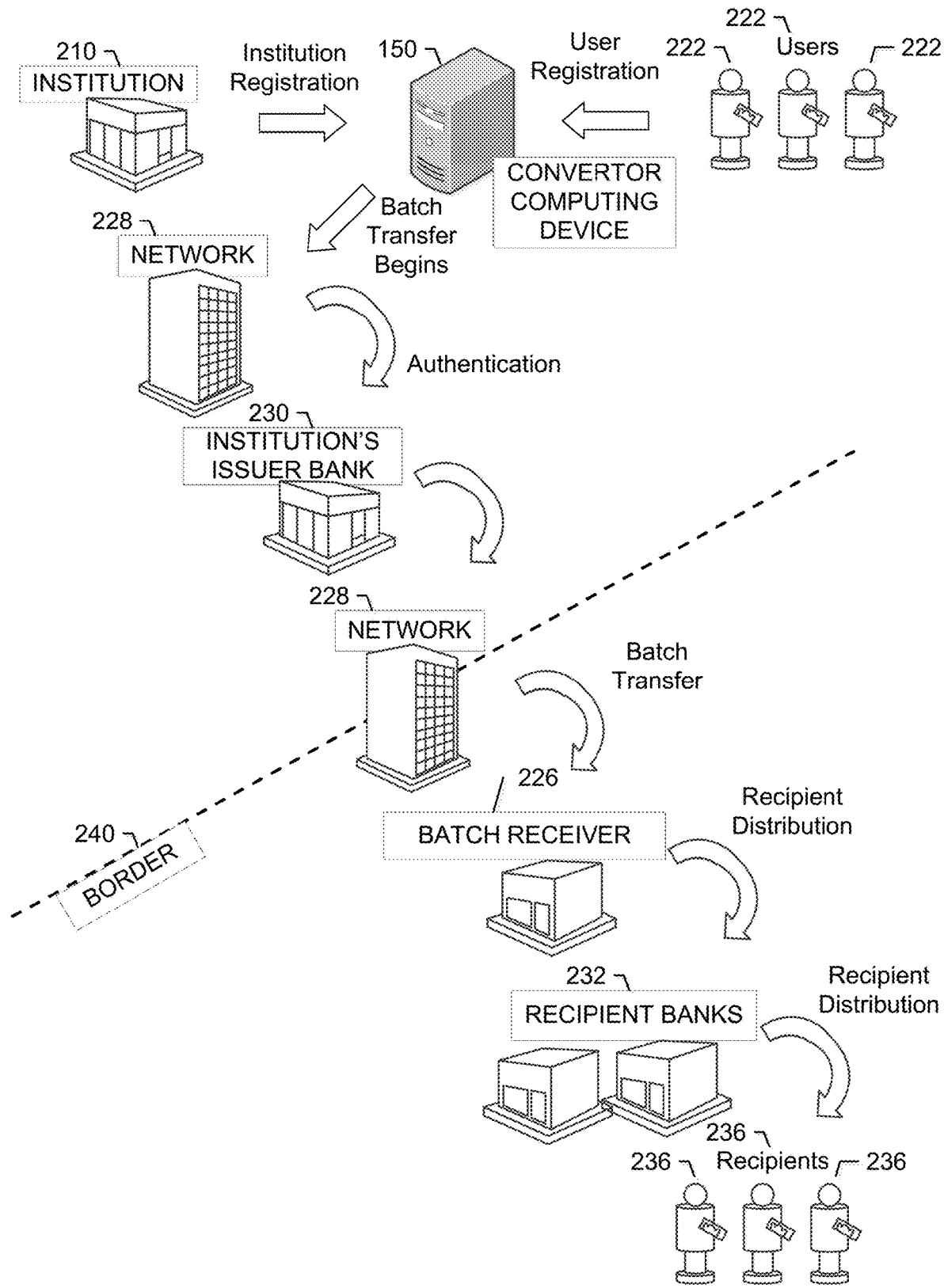

FIG. 1 is a simplified block diagram of an example convertor system 100, including a convertor computing device 150, used for reducing cross-border traffic over a network. FIG. 2 is a schematic diagram illustrating an example multi-party payment processing system 200 that may be implemented using convertor computing device 150. With reference to FIGS. 1 and 2, convertor system 100 includes a payment processor 110, which is part of a payment processing network that may be implemented in the performance of payment-by-card transactions. Payment processor 110 is associated with interchange network 228. In the example embodiment, convertor computing device 150 is configured to transmit bundled transfer data via interchange network 228.

In the example embodiment, convertor system 100 includes a server system 112 and client systems 114. Client systems 114 may include at least one user computing device, at least one institution computing device, at least one issuer computing device, and at least one batch receiver computing device. Client systems 114 may further include at least one recipient bank computing device and at least one recipient computing device. In some embodiments, client systems 114 include computing devices configured to implement a web browser or a software application, which enables client systems 114 to access server system 112 using the Internet. Client systems 114 may be communicatively coupled to the Internet through one or more interfaces including, but not limited to, at least one of a network, such as the Internet, a local area network (LAN), a wide area network (WAN), or an integrated services digital network (ISDN), a dial-upconnection, a digital subscriber line (DSL), a cellular phone connection, and a cable modem. Alternatively, client systems 114 include any device capable of accessing the Internet including, but not limited to, a desktop computer, a laptop computer, a personal digital assistant (PDA), a cellular phone, a smartphone, a tablet, a phablet, or other web-based connectable equipment. In some embodiments, client systems 114 are similar. In other embodiments, client systems 114 may be different. In the example embodiment, respective client systems 114 are associated with users 222, an institution 210, an issuer 230 associated with institution 210, and a batch receiver 226. Client systems 114 may be further associated with recipients 236 and respective recipient banks 232 associated with recipients 236. More specifically, the user computing devices are associated with users 222 (e.g., employees, registered users, and/or consumers), the institution computing device is associated with institution 210 (e.g., employer, business), the issuer computing devices are associated with institution's issuer 230 and, in some embodiments, the user's issuers (not shown), the batch receiver computing device is associated with batch receiver 226, the recipient bank computing devices are associated with recipient banks 232, and the recipient computing devices are associated with recipients 236. Client systems 114 may be communicatively coupled to server system 112 and payment processor 110. In the example embodiment, convertor system 100 is provided a value-added service by payment processor 110 and/or convertor computing device 150 is hosted on server system 112 maintained by payment processor 110. Alternatively, convertor system 100 is provided by a third party and/or convertor computing device 150 is hosted on server system 112 associated with a third party.

In the example embodiment, server system 112 includes a database server 118 that is communicatively coupled to a database 120 for storing data. In the example embodiment, database 120 stores institution profile data, sets of user profile data for each user 222, and other data that may be required for convertor computing device 150 to function as described herein.

According to the example embodiment, database 120 is disposed remotely from server system 112. In other embodiments, database 120 is centralized, and may be a part of server system 112. In the example embodiment, an administrator and/or an analyst (not shown) of convertor system 100, a user 222, institution 210, an institution's issuer 230, batch receiver 226, and/or recipient banks 232 are able to access database 120 through a client system, such as one of client systems 114, by logging onto server system 112.

In some embodiments, server system 112 associated with interchange network 228 is used for processing transaction data. Accordingly, server system 112 and client systems 114 may be utilized to process transaction data relating to individual transactions by institution 210 utilizing an institution account issued by institution's issuer 230, and/or individual transactions by users 222 utilizing a user account issued by the associated user's issuer and processed by interchange network 228.

In the example embodiment, convertor system 100 provides a convertor service to securely transfer funds of user 222 located in the institution country (e.g., user 222 is an employee of institution 210 and receives a paycheck in the institution country) to one or more recipients 236 in other countries in a bundled transaction across border 240. Moreover, convertor computing device 150 enables users 222 to enroll in the convertor service using a single integrated website or mobile application, as will be described herein.

The enrollment website/application may be offered to users 222 via links from institution 210 and/or via links from the user's issuer banks participating in the convertor service, for example.

In the example embodiment, convertor computing device 150 is configured to receive institution profile data from a first of client systems 114 at the time institution 210 enrolls in the convertor service. As described above, the institution profile data may include, among other data, an identifier of institution 210 (e.g. name and/or tax ID of the employer), institution authentication credentials (e.g., username, password, biometric data of authorized agents of the employer, security questions, security answers, or the like), institution account data (e.g. an identifier of a payment card account associated with the employer in the country in which the employees receive paychecks, such as a primary account number (PAN), or a virtual account number or tokenized identifier associated with the PAN), an institution computing device identifier, at least one identifier of batch receiver 226 (the entity in each receiving country, such as a financial institution, designated by institution 210 to receive bundled transfers from institution 210), at least one corresponding batch receiver account number (e.g., an identifier of a payment card account associated with the corresponding batch receiver 226, such as a primary account number (PAN), or a virtual account number or tokenized identifier associated with the PAN), a country identifier of the country of batch receiver 226, and/or other data associated with the originating account used by institution 210 to send bundled transfers from the institution country across a border 240 to the corresponding batch receivers 226 in each receiving country and/or the batch receiver account designated in each receiving country to receive the bundled transfers.

Once institution 210 is enrolled in the convertor service, convertor computing device 150 is configured to receive user profile data from users 222 using at least one second client system 114 at the time each user 222 enrolls in the convertor service. The term "enrollment" in this context includes not just an initial enrollment or registration in the convertor service by each user 222, but also any later updates or modifications to the user profile data by each user 222. The user profile data may include, among other data regarding user 222, a user identifier, user authentication credentials (e.g., username, password, biometric data, security questions, security answers, or the like), user account data (e.g. an identifier of a payment card account associated with user 222, such as a primary account number (PAN), or a virtual account number or tokenized identifier associated with the PAN), a user computing device identifier, a remittance amount selected by user 222 (e.g., a selected percentage or currency amount from a regular paycheck), a remittance timing selected by user 222 (e.g., monthly, contemporaneous with every paycheck, contemporaneous with every third paycheck), an identifier of at least one recipient 236 (e.g., recipient 236 is an individual or an entity, such as a financial institution, selected by user 222 to receive the transfer), a recipient account identifier (e.g., an identifier of a payment card account associated with recipient 236, such as a primary account number (PAN), or a virtual account number or tokenized identifier associated with the PAN), a recipient country code, and/or other data associated with the user and/or the transfer to the intended at least one recipient 236.

In some embodiments, convertor computing device 150 facilitates individual transfers from a user account to institution 210 account to fund the batch payment. For example, convertor computing device 150 is in communication with at least one issuer computing device (e.g. one of client systems 114) associated with at least one user's issuer with which users 222 have a relationship. The communication between convertor computing device 150 and the at least one issuer computing device may be a direct communication or via payment network 228. In certain embodiments, during the process of enrolling each user 222, convertor computing device 150 is configured to send user profile data, such as the user account data and selected remittance amount, to the user's 222 issuing bank, and the user's issuing bank responds by verifying or denying the validity of the user account data submitted by user 222. If user 222 is unable to submit valid user account data, user 222 may be excluded from participation in the convertor service. In alternative embodiments, convertor computing device 150 does not validate the user profile data with the user's issuer at the time of enrollment.

For example, institution 210 is an employer, and users 222 are employees of the employer who desire a convenient and/or reduced-cost method to remit a portion of their paychecks to recipients 236 in another country. Convertor computing device 150 enrolls employer institution 210 in the convertor service, stores the institution profile data within database 120, and enables employee users 222 to enroll in the convertor service, such as via links on an employer intranet site and/or via an email to employees via the employer. Convertor computing device 150 is configured to receive a set of user profile data from each enrolled user 222 and to store the user profile data within database 120. After enrollment of employee users 222, institution 210 withholds the transfer amount from the employee user's paycheck according to instructions generated by convertor computing device 150 from the user profile data. Alternatively, convertor service 100 initiates individual transfers from a user account to the institution account via payment processing network 228 to fund the batch transfer. Convertor computing device 150 aggregates and transfers the amounts from employee users 222 to individuals or institutions located in different countries, as instructed by the user profile data, as part of a single bundled transaction per pay period for each country.

In the example embodiment, convertor computing device 150 is configured to automatically generate the batch transactions based on a predefined schedule. For example, institution 210 is an employer, and convertor computing device 150 is configured to automatically process batch transfers at or just after the end of employer institution's 210 pay period, such as every first or last day of each month, bi-weekly, or weekly. Alternatively, the predefined schedule is any other suitable schedule selected by institution 210. In other alternative embodiments, an operator instructs convertor computing device 150 as to the timing of at least one bundled transfer process executed by convertor computing device 150.

In the example embodiment, at the time a bundled transfer process is to occur, convertor computing device 150 generates transfer data from the user profile data stored in database 120. Additionally or alternatively, convertor computing device 150 generates transfer data from appropriate data retrieved from other data sources (e.g., retrieving, from an existing data source on payment processing network 228, a recipient bank identifier, a recipient bank computing device identifier, and/or a recipient country code associated with recipient bank 232 listed by user 222 in the user profile data) or from additional user input.

The transfer data includes a set of transfer data for each scheduled individual transfer to recipients 236 according to the user profile data. More specifically, convertor computing device 150 parses the user profile data of users 222 and compares the current date to the remittance timing identified for each recipient 236 by users 222 to determine which recipients 236 to include in the batch transfer. In some embodiments, at least one user 222 at enrollment designates a plurality of transfer amounts to a corresponding plurality of recipients 236, and convertor computing device 150 is configured to generate a plurality of sets of transfer data for the at least one user 222, with a respective set of transfer data for each recipient 236 identified by the at least one user 222 in the user profile data. Additionally or alternatively, at least one recipient 236 is identified to receive respective individual transfer amounts from a plurality of users 222, and convertor computing device 150 is configured to generate a plurality of sets of transfer data associated with the at least one recipient 236, with respective sets of transfer data based on the respective user profile data of the plurality of users 222 identifying the at least one recipient 236.

For the individual transfers to recipients 236, convertor computing device 150 extracts information from the user profile data to define the individual transfer from the corresponding user 222 according to the user's user profile data. For example, each set of transfer data for a particular recipient 236 includes, among other data, the user identifier, an origin code (e.g., a code identifying the country where the user's paycheck is deposited), a transfer amount (e.g., a selected percentage of, or currency amount from, user's 222 most recent paycheck), a time and date of the transaction, data descriptive of the transfer (e.g., a description of the reason for the transfer), the recipient account identifier of recipient 236, the recipient bank identifier of the corresponding recipient bank 232, a recipient bank computing device identifier associated with the corresponding recipient bank 232, a destination code (e.g., the country code of recipient bank 232), and/or other data associated with the transfer to recipient 236.

In the example embodiment, convertor computing device 150 instructs institution 210 to withhold the individual transfer amounts selected by each user 222, along with the associated transaction fees, from the user's 222 paycheck according to the remittance timing selected by user 222 in the user profile data, and institution 210 uses the withheld amounts to fund the batch transfer, for example by transmitting the withheld amounts to the institution account.

In other embodiments, convertor service 100 initiates individual transfers from a user account in the institution country to the institution account via payment processing network 228 to fund the batch transfer. For example, the transfer data includes user account data, an identifier of the user's issuing bank, and an issuer computing device identifier associated with the user's issuing bank, and convertor computing device 150 is configured to send each set of transfer data to the associated user's issuing bank. The user's issuing bank verifies or denies that the associated user 222, at the time of the transfer, has sufficient funds or credit associated with the user account to fund the user's selected transfer amount. In some such embodiments, convertor computing device 150 sends an authorization request message (e.g., ISO® 8583 compliant message, ISO® 20022 compliant message) including the transfer data to the associated issuer computing device. In response, convertor computing device 150 receives from the respective user's issuer an authorization response message confirming, for example, that a PAN associated with the user account data has sufficient funds or credit to fund the user's selected transfer amount. Convertor computing device 150 is thus configured prevent users 222 with insufficient funds or credit at the time of the batch transfer from participating in the batch transfer.

In some such embodiments, convertor computing device 150 includes in the authorization request message to the user's issuer an indication that the individual transfer submitted with respect to user 222 is not to be completed. In other embodiments, convertor computing device 150 otherwise notifies the user's issuer (e.g., after the authorization response message is received) that the individual user transaction is not to be completed. Thus, convertor computing device 150 is configured to ensure that the individual transfers by each user 222 are not submitted as separate transactions across the border.

Convertor computing device 150 further generates batch data from the transfer data and the institution profile data. Additionally or alternatively, convertor computing device 150 generates batch data from appropriate data retrieved from other data sources (e.g., retrieving, from an existing data source on payment processing network 228, the batch receiver identifier, the batch receiver computing device identifier, and/or the batch receiver country code associated with batch receiver 226 listed by institution 210 in the institution profile data) or from additional input from institution 210.

The batch data for each destination country includes the aggregated batch transfer amount from the sets of transfer data for the corresponding destination country, as well as other information necessary to define the respective single bundled transfer to each batch receiver 226 according to the institution profile data. More specifically, convertor computing device 150 parses the transfer data, extracts the transfer amount and the destination code for each set of transfer data, and, subject in some embodiments to authorization by the respective user's issuing bank, aggregates the transfer amounts associated with each destination code to determine a total batch transfer amount for the batch receiver 226 corresponding the destination code. For example, the batch data for a particular destination country includes, among other data, an identifier of institution 210, the institution account data, the institution computing device identifier, the identifier of institution's issuing bank 230, the institution issuer computing device identifier associated with institution's issuing bank 230, the aggregated transaction amount to the corresponding destination country, a time and date of the batch transaction, data descriptive of the batch transaction, the batch receiver identifier, the batch receiver computing device identifier, the batch receiver account identifier, the destination code (e.g., the country code associated with the destination country), other information to be included in an authorization request message (e.g., ISO® 8583 compliant messages and ISO® 20022 compliant messages) associated with the bundled transaction, and/or other data associated with the bundled transfer to the batch receiver 226 in the corresponding destination country.

In the example embodiment, convertor computing device 150 is configured to send each batch transaction to the institution's issuing bank 230. Institution's issuing bank 230 verifies that institution 210 has sufficient funds or credit associated with the institution account to fund the batch transfer amount. In some such embodiments, convertor computing device 150 sends an authorization request message (e.g., ISO® 8583 compliant message, ISO® 20022 compliant message) including the batch data to institution's issuing bank 230. In response, convertor computing device 150 receives from institution's issuing bank 230 an authorization response message confirming, for example, that a PAN associated with the institution account data has sufficient funds or credit to fund the batch transfer amount. The batch transfer to the corresponding batch receiver account may then be completed. For example, the batch transfer is cleared and settled between institution's issuing bank 230 and batch receiver 226 again using standard (e.g., ISO®-compliant) messaging over payment processing network 228.

In some embodiments, users 222 designate recipients 236 in a plurality of destination countries, and convertor computing device 150 is configured to generate a plurality of sets of batch data for institution 210, with a respective set of batch data for institution 210 corresponding to each destination country. For example, a first group of users 222 elects to transfer funds to recipients 236 in India, a second group of users 222 elects to transfer funds to recipients 236 in China, and a third group of users 222 elects to transfer funds to recipients 236 in Zambia. At the scheduled transfer time, convertor computing device 150 parses the user profile data for all users 222, and detects sets of transaction data having destination codes corresponding to India, China, and Zambia. Convertor computing device 150 aggregates the individual transfer amounts associated with India in the transfer data into a batch payment amount, retrieves from the institution profile data information regarding batch receiver 226 designated by institution 210 in India, and compiles and processes a single payment transaction for the batch payment amount from the institution account in the originating country to batch receiver 226 in India. Likewise, convertor computing device 150 aggregates the individual transfer amounts associated with China in the transfer data into a batch payment amount, retrieves from the institution profile data information regarding batch receiver 226 designated by institution 210 in China, and compiles and processes a single payment transaction for the batch payment amount from the institution account in the originating country to batch receiver 226 in China. Convertor computing device 150 performs the same aggregation and batch transfer process for Zambia.

By bundling the multiple payment transactions desired by users 222 into each destination country into a respective "batch," convertor computing device 150 reduces a large number of individual cross-border transactions by users 222 into a single payment transaction for each destination country. Thus, convertor system 100 substantially reduces cross-border traffic in payment network 228, particularly at peak transfer times such as typical payday dates. Additionally, the plurality of individual transfers are initiated substantially simultaneously via the analysis (e.g., parse) of the user profile data, increasing a speed of processing for the plurality of individual transfers. Moreover, because convertor computing device 150 performs recurring transfers automatically on the predefined schedule after users 222 register, the processing speed for such recurring transfers is again increased. Moreover, the cost of a single cross-border transfer is significantly less than a plurality of cross-border transfers. Thus, convertor computing device 150 enables setting a fixed fee pricing structure for users 222 that is less expensive to each user 222, as compared to users 222 arranging individual cross-border transfers.

In the example embodiment, convertor computing device 150 is configured to bundle the transaction data into a single batch for each destination country. The term "country" in this context also should be understood to encompass a common commerce zone or foreign trade zone (e.g., European Union, Eurasian Economic Union, etc.), rather than just a single nation. In other embodiments, convertor computing device 150 is configured to bundle the transaction data into a plurality of batches for at least one country. More specifically, convertor computing device 150 is configured to bundle the payment transactions based on other commonalities among the transaction data, such as a common recipient bank 232 (e.g., same financial institution) and/or a common recipient 236 (e.g., same mortgage company, same loan company, or the like). In such cases, the common recipient bank 232 or recipient 236 may also function as batch receiver 226. In some such embodiments, such as where institution 210 is associated with a large number of users 222 from a particular country, bundling the transaction data of users 222 into a plurality of batches for the particular country based on such additional commonalities simplifies processing in the destination country to the extent that more than one cross-border transaction to the destination country is justified, while nevertheless greatly reducing the overall number of cross-border transfers over the payment processing network.

In the example embodiment, convertor computing device 150 is configured to generate an instruction data file that instructs batch receiver 226 as to distribution of the aggregated batch transfer amount to recipients 236. More specifically, convertor computing device 150 generates the instruction data file that includes, for each user-scheduled individual transfer having the recipient country matching the batch receiver country, instructions to transfer the individual transfer amount from batch receiver 226 to the corresponding recipient account identifier at the corresponding recipient bank 232. For example, convertor computing device 150 generates the instruction data file from the transfer data used to generate the corresponding batch transaction. In the example embodiment, convertor computing device 150 compiles the individual instructions corresponding to each recipient 236 into a single instruction data file for transmission to each batch receiver 226. Alternatively, convertor computing device 150 generates a plurality of instruction data files for transmission to one batch receiver 226, and each instruction data file corresponds to recipients 236 associated with, for example, a common recipient bank 232.

In the example embodiment, the instruction data file is in a standard format, such as but not limited to a CTX format, that enables batch receiver 226 to automatically apply the file to distribute the aggregated batch transfer amount among recipients 236 according to the individual transfer amounts. Alternatively, the instruction data file is in a format that requires further processing by batch receiver 226 prior to distribution of the aggregated batch transfer amount among recipients 236 according to the individual transfer amounts. In the example embodiment, the instruction data file is transmitted contemporaneously with the batch transfer from convertor computing device 150 to batch receiver 226, via payment processing network 228. Alternatively, the instruction data file is transmitted from convertor computing device 150 to batch receiver 226 at a different time and/or via another suitable method, such as via the Internet. After recipient bank 232 receives the payment transaction, the amount of funds in the PAN of recipient 236, for example, is increased by the individual transfer amount.

Embodiments described herein may relate to a transaction card system, such as a credit card and/or debit payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, New York).

In general, with respect to payment processing system 200 using interchange or payment processing network 228, a financial institution called the "issuer bank" issues an account to a holder, such as user 222 or an agent of institution 210. The account may be associated with a transaction card or electronic payments account identifier, such as a credit card or debit card. The holder uses the transaction card, for example, to tender payments to a merchant for a purchase or to otherwise transfer funds. To accept payment from the user account, a merchant must normally establish an account with a financial institution that is part of the financial payment system. This financial institution is usually called the "merchant's bank" or "acquiring bank." When the holder, for example the agent of institution 210, initiates a funds transfer with the account, one of client systems 114 (shown in FIG. 1) requests authorization from institution's issuer bank 230 for the amount of the transfer. The request is performed via the client system 114 which communicates electronically with the transaction processing computers of institution's issuer bank 230. Alternatively, institution's issuer bank 230 may authorize a third party to perform transaction processing on its behalf. In this case, client device 114 will be configured to communicate with the third party. Such a third party is usually called an "issuer processor" or a "third party processor."

Using interchange network 228, client device 114 and/or computer devices of the third party processor will communicate with computers of institution's issuer bank 230 to determine whether the account associated with institution 210 is in good standing and whether the amount of the transfer is covered by the account available balance or credit line. Payment processing network 228 may perform domain control validations and de-tokenization on the authorization request message. Based on these determinations, the request for authorization will be declined or accepted. If the request is accepted, an authorization code is issued to the merchant's bank.

When a request for authorization is accepted, the available balance or credit line of the account is decreased. Normally, a charge for a payment card transaction is not posted immediately to the account because bankcard associations, such as Mastercard International Incorporated®, have promulgated rules that do not allow payment transactions, such as transfer of funds, to be charged until institution's issuer bank 230 transfers the funds to the merchant account. However, with respect to at least some debit card transactions, a charge may be posted at the time of the payment transaction. When the funds are transferred, the account is decreased by the amount of the transferred funds and the account of the merchant is increased by the amount of the transferred funds. If institution 210 cancels a transaction before it is captured, a "void" is generated. Interchange network 228 and/or institution's issuer bank 230 stores the transaction data in database 120 (shown in FIG. 1).

After a funds transfer has been made, a clearing process occurs to transfer additional transaction data related to the funds transfer among the parties to the transaction, such as the merchant, interchange network 228, and institution's issuer bank 230. More specifically, during and/or after the clearing process, additional data, such as a time of transfer, a merchant name, cardholder account information, a type of transaction, description (e.g., reason) of transfer, and/or other suitable information associated with a transaction and transmitted between parties to the transaction as transaction data, and may be stored by any of the parties to the transaction.

After a transaction is authorized and cleared, the transaction is settled among the merchant's bank and institution's issuer bank 230. Settlement refers to the transfer of financial data or funds among institution's issuer bank 230 and the merchant's bank related to the transaction. In the example embodiment, institution 210 initiates the batch transfer authorized through institution's issuer bank 230 and received by batch receiver 226, which plays the role of the merchant's bank described above. Payment processing network 228 may also be used for distribution of individual transfer amounts within the destination country from batch receiver 226 to recipients 236, and/or for individual transfers from the accounts of users 222 to the account of institution 210 as described above. In some embodiments, the operator of payment processing network 228 offers the convertor service to institution 210, which may present the service to employees as a benefit due to the associated reduced transaction fees, and/or convertor computing device 150 is hosted by the operator of payment processing network 228. Simultaneously, payment processing network 228 benefits from the associated reduction of traffic on payment processing network 228, especially across border 240 where bandwidth may be limited.

Figure 3:
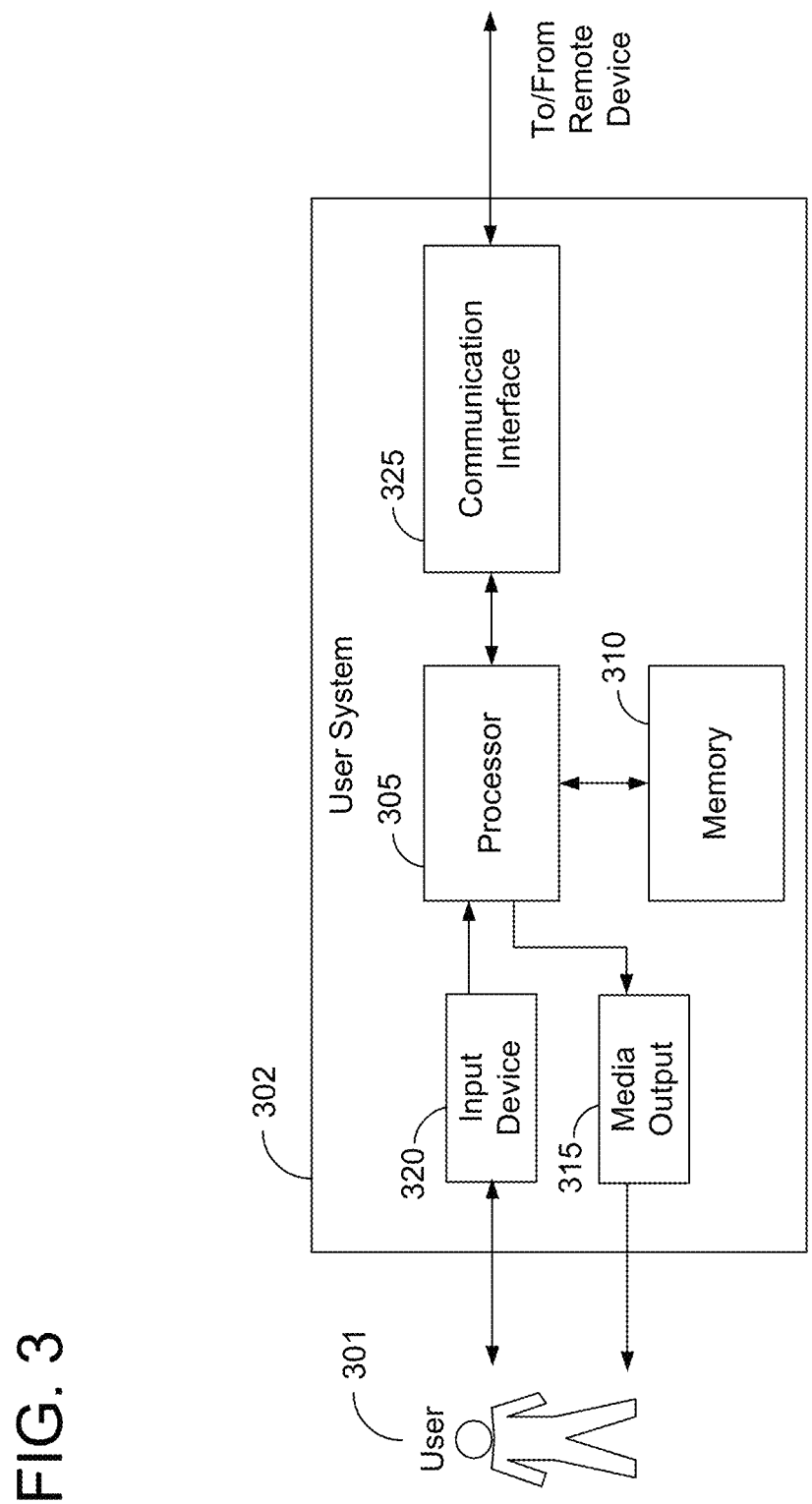

FIG. 3 illustrates an example configuration of a user system 302 that may be used to implement, for example, one of client systems 114 (shown in FIG. 1) configured to transmit data to convertor computing device 150 (shown in FIG. 1). In the example embodiment, user system 302 includes a processor 305 for executing instructions. In some embodiments, executable instructions are stored in a memory 310. Processor 305 may include one or more processing units, for example, a multi-core configuration. Memory 310 is any device allowing information such as executable instructions and/or written works to be stored and retrieved. Memory 310 may include one or more computer readable media.

User system 302 also includes at least one media output component 315 for presenting information to a user 301. User 301 may be, but is not limited to, user 222 (shown in FIG. 2) or an agent of institution 210 (shown in FIG. 2). Media output component 315 is any component capable of conveying information to user 301. For example, media output component 315 may be a display component configured to display component lifecycle data in the form of reports, dashboards, communications, and the like. In some embodiments, media output component 315 includes an output adapter such as a video adapter and/or an audio adapter. An output adapter is operatively coupled to processor 305 and operatively connectable to an output device, such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, an iris reader/scanner, a retina reader/scanner, a profile scanner, or the like. A single component, such as a touch screen, may function as both an output device of media output component 315 and input device 320. A single component, such as a touch screen, may function as both an output device of media output component 315 and input device 320. User system 302 may also include a communication interface 325, which is communicatively connectable to a remote device such as server system 112 (shown in FIG. 1). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from server system 112. A client application allows user 301 to interact with a server application from server system 112.

Figure 4:
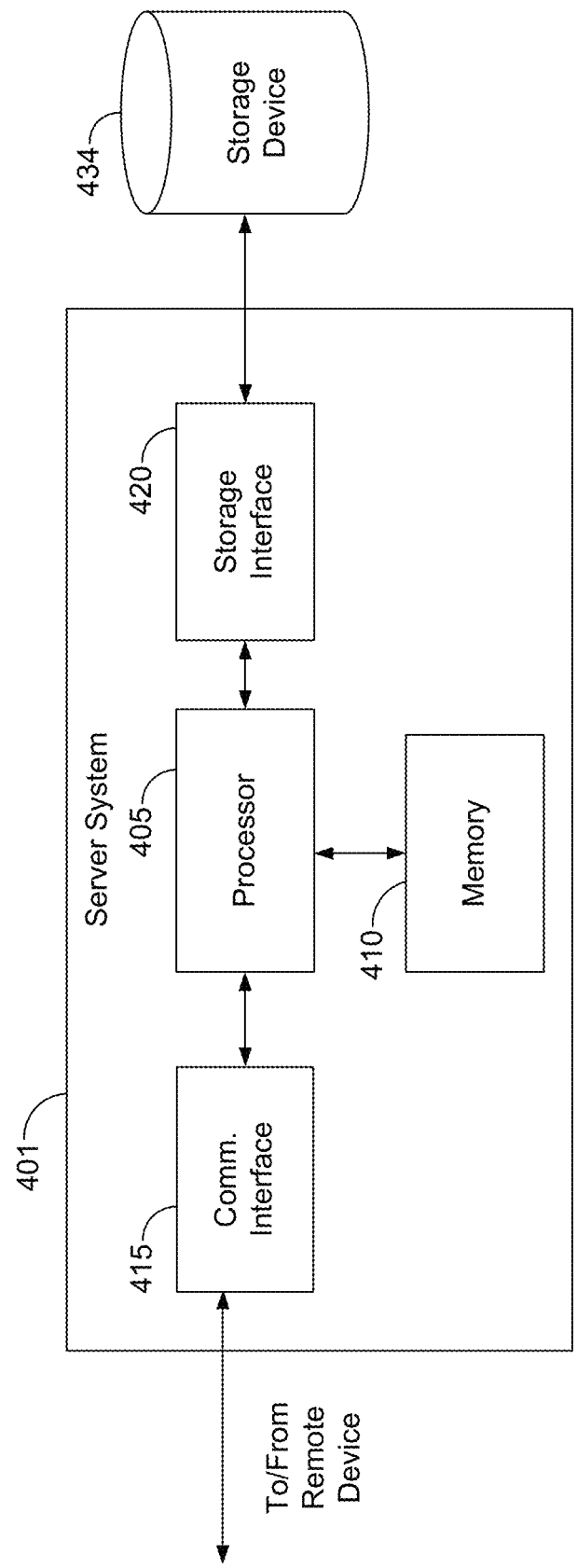

FIG. 4 illustrates an example configuration of a server system 401 that may be used to implement, for example, server system 112 (shown in FIG. 1) that includes convertor computing device 150 (shown in FIG. 1). Server system 401 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. More specifically, the instructions may cause various data manipulations on data stored in a storage device 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 405 is operatively coupled to a communication interface 415 such that server system 401 is capable of communicating with a remote device, such as a user system 301 (shown in FIG. 3) or another server system 401. For example, communication interface 415 may receive communications from client systems 114 via a plurality of network connections, as illustrated in FIG. 1.

Processor 405 may also be operatively coupled to storage device 434 that may be used to implement database 120 (shown in FIG. 1). Storage device 434 is any computer-operated hardware suitable for storing and/or retrieving data. In some embodiments, storage device 434 is integrated in server system 401. In other embodiments, storage device 434 is external to server system 401. For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420 that may be used to implement database server 118. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
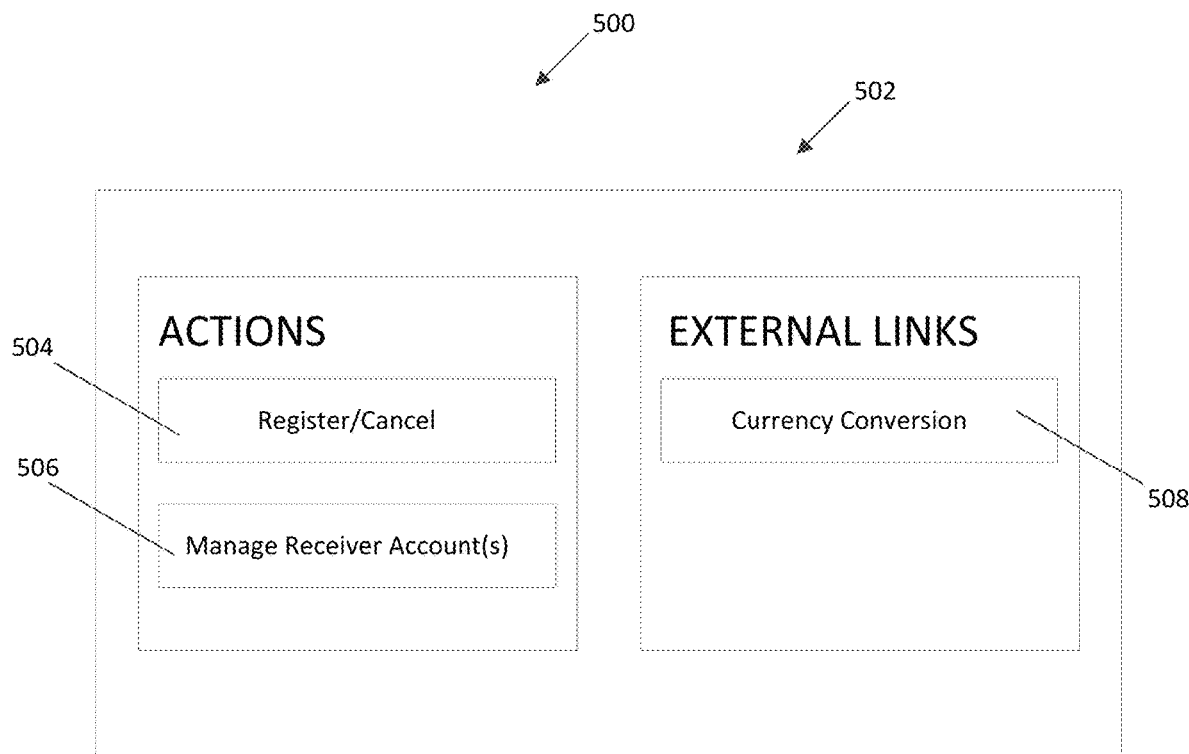
Figure 6:
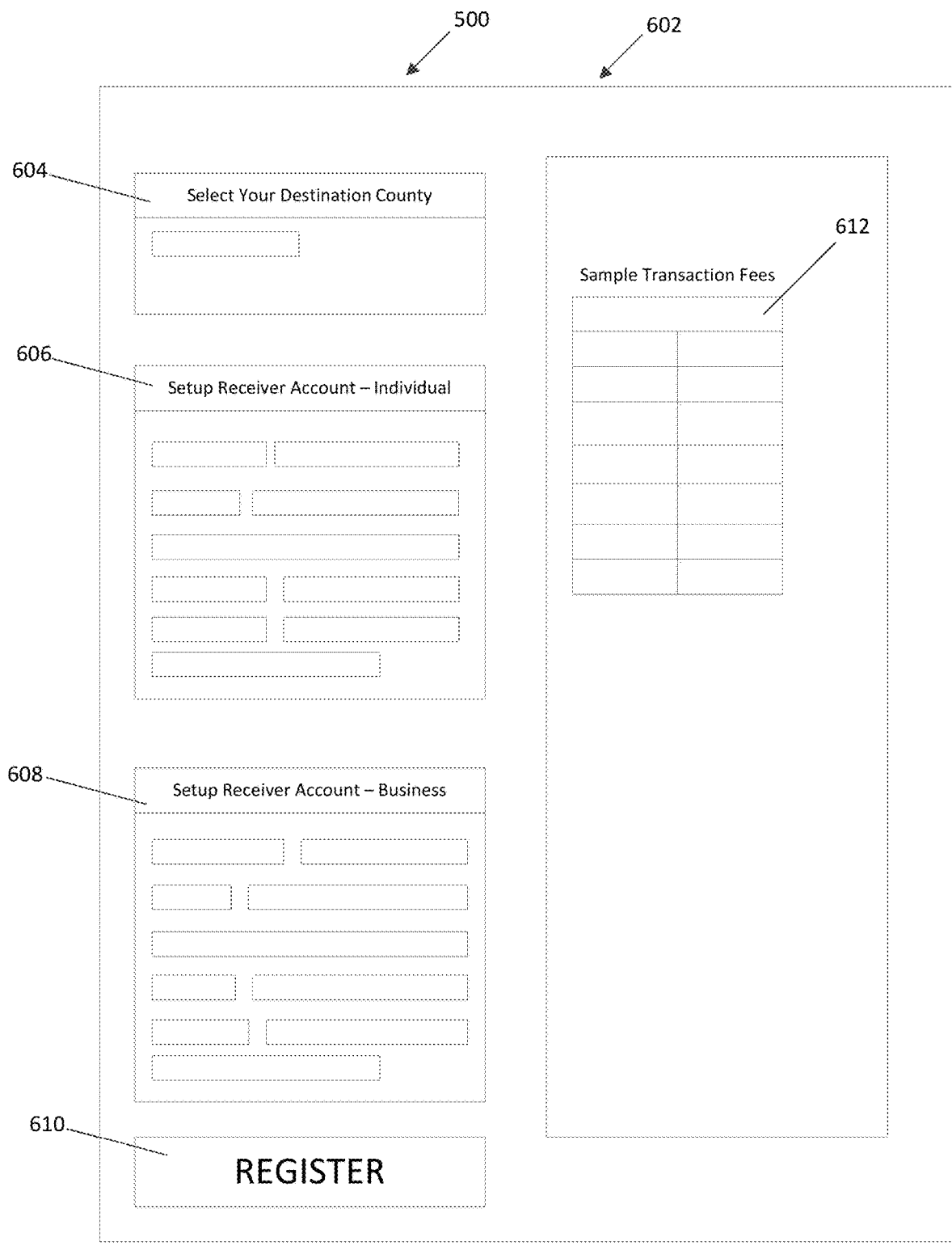
Figure 7:

FIGS. 5-8 are schematic diagrams illustrating an example graphical user interface (GUI) 500 that may be provided by convertor computer device 150 (shown in FIG. 1) and presented to users 222 (shown in FIG. 2) to facilitate enrollment of users 222 in the convertor service. More specifically, FIG. 5 is an example user home screen 502 of GUI 500, FIG. 6 is an example user registration screen 602 of GUI 500, FIG. 7 is an example account management screen 702 of GUI 500, and FIG. 8 is an example summary screen 802 of GUI 500.

Referring to FIGS. 1, 2, and 5, user home screen 502 includes a register button 504, a manage receiver account(s) button 506, and a currency conversion button 508. In the example embodiment, user 222 registers for the convertor service by selecting register button 504, enters information relating to recipient(s) 236 by selecting manage receiver account(s) button 506, and reviews current currency conversion data retrieved by convertor computing device 150 for a country of interest by selecting currency conversion button 508.

In the example embodiment, in response to selection of registration button 504, convertor computing device 150 prompts user 222, via GUI 500, for one or more authentication criteria (e.g., a personal identification number (PIN) provided separately by institution 210 and/or biometric authentication) in order to register for the convertor service. In other embodiments, convertor computing device 150 requests the authentication criteria after a registering user 222 has input data (e.g., at least a portion of the user profile data) into GUI 500. Alternatively, convertor computing device 150 does not require authentication by user 222. For example, authentication is required by client system 114 (e.g., by logging in to an internal website of institution 210 where a link to GUI 500 is provided) prior to operation of GUI 500. In some embodiments, upon authentication, convertor computing device 150 assigns a unique identifier (e.g., username) to user 222. In other embodiments, user 222 provides the unique identifier to convertor computing device 150. Generally, the unique identifier is different from the number associated with the user account number of user 222. After the unique identifier is provided, convertor computing device 150 stores the unique identifier in database 120 linked to the user profile data contemporaneously or subsequently entered by user 222.

Referring to FIGS. 1, 2, 5, and 6, in the example embodiment, in response to selection of registration button 504 and authentication of user 222, user registration screen 602 of GUI 500 is presented to user 222. User registration screen 602 is configured to capture user profile data input by user 222. In the example embodiment, user registration screen 602 includes a destination country section 604 (e.g., a section to receive input identifying the country to which user 222 will be transferring a portion of the user's paycheck), an individual receiver account section 606 (e.g., a section to receive input describing a non-business-entity recipient 236), a business receiver account section 608 (e.g., a section to receive input describing a business entity recipient 236), a register button 610, and a transaction-fee section 612.

For example, individual receiver account section 606 may include, but is not limited to, fields corresponding to first and last name of non-business entity recipient 236, the mailing address of non-business-entity recipient 236, phone number and/or email address of non-business entity recipient 236, the recipient account identifier, and/or other data associated with the user and/or the intended recipient 236. Similarly, business receiver account section 608 may include the business name of the business-entity recipient 236, the mailing address of business-entity recipient 236, phone number and/or email address of business entity recipient 236, the recipient account identifier, and/or other data associated with the user and/or the intended recipient 236. Convertor computing device 150 may also determine the user computing device identifier associated with user 222 based on the connection parameters received from client system 114 during the registration process. Sections 606 and 608 may permit entries for more than one recipient 236, including more than one non-business-entity recipient 236 and/or more than one business-entity recipient 236.

Transaction-fee section 612 displays the current transaction fees to be charged to user 222 for the use of convertor system 100, based for example upon the user's 222 selection of the destination country in section 604, to facilitate user's 222 decision to proceed with registration for convertor system 100. For example, $1 U.S. Dollar ("USD") fee may be charged for fund transfers amounts between $0.01 USD to $100 USD, and $3 USD fee may be charged for funds transfer amounts between $100.01 USD to $1000 USD. After user 222 inputs information and reviews the applicable fees, user 222 selects register button 610 to register for the convertor service.

Referring to FIGS. 1, 2, 5, and 7, in the example embodiment, in response to selection of manage receiver account(s) button 506, account management screen 702 of GUI 500 is presented to user 222. Account management screen 702 includes, but is not limited to, a user information section 704, a user account section 706, a recipient account information section 708, an acceptance button 710, and a cancel button 712.

In the example embodiment, user information section 704 includes fields corresponding to a pay type, a name of user 222 (or "worker" in the example embodiment), a country of employment or paycheck receipt of user 222, a currency of payment to user 222, and a number of payment elections allowed (e.g., number of different recipients 236 to which user 222 may remit payments using convertor system 100). Additionally or alternatively, user information section 704 includes any other suitable information that facilitates user's 222 use of convertor system 100. In the example embodiment, user account section 706 includes fields that display information about user's 222 regular paycheck deposit, such as direct deposit to a domestic banking account. Additionally or alternatively, user account section 706 includes any other suitable information that facilitates user's 222 use of convertor system 100. The information in user information section 704 and user account section 706 may be retrieved from registration information previously entered by user 222 and/or from employment records of institution 210, for example. Additionally or alternatively, user 222 may directly input or revise the information in these fields.

In the example embodiment, recipient account section 708 includes fields that display information associated with recipients 236 identified by user 222 for payment via convertor system 100. Additionally or alternatively, receiver account section 706 includes any other suitable information that facilitates user's 222 use of convertor system 100. The information in these fields may be retrieved from information previously entered by user 222 using user registration screen 602 (shown in FIG. 6), such as destination country, recipient account, and recipient bank, for example. Additionally or alternatively, user 222 may directly input or revise the information in these fields.

Also in the example embodiment, recipient account section 708 includes user input fields for selection of the transfer amount (e.g. in currency or as a percentage of the user's 222 paycheck), and of the frequency of transfer (e.g., every paycheck, every second paycheck, etc.) for each recipient 236. Thus, in the example embodiment, user registration screen 602 facilitates one-time entry of information regarding recipients 236 into database 120, while recipient account section 708 enables periodic management (e.g., re-allocation) by user 222 of amounts to be transferred to each stored recipient 236. Alternatively, transfer amounts and recipient information are entered via the same screen, or via any suitable number of screens, of GUI 500.

After reviewing or updating data in recipient account section 708, user 222 either accepts the selected transfer options by selecting acceptance button 710, or cancels the selected transfer options by selecting the cancel button 712. If user 222 selects acceptance button 710, convertor system 100 includes the transfers in the batching process as described above, for example on a per-paycheck basis using the designated amount(s) in recipient account section 708.

Referring to FIGS. 1, 2, 5, and 8, in the example embodiment, GUI 500 further includes a summary screen 802 of past transfers of user 222. In the example embodiment, summary screen 802 includes a transaction history 804 for each previously initiated individual transfer completed by convertor system 100 on behalf of user 222. For example, each transaction history 804 includes, but is not limited to, date of transfer, recipient 236 name, destination country, recipient account data associated with recipient 236, transfer amount, transaction fee, status of transfer (e.g., completed, in process), print receipt option, and/or any other suitable data of interest to user 222.

Figure 9:
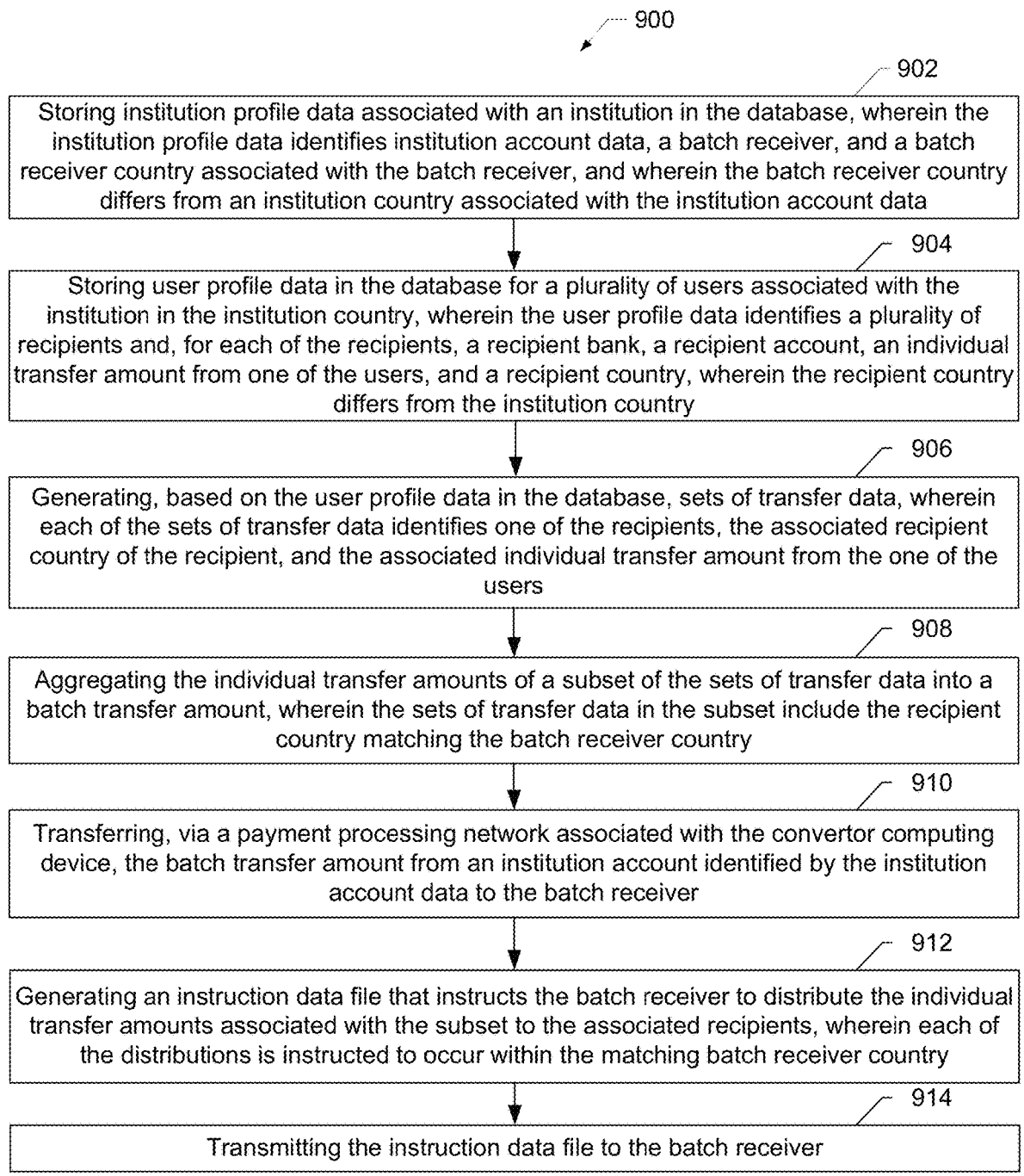

FIG. 9 is an example flow diagram illustrating a method flow 900 by which at least one convertor computing device 150 (shown in FIG. 1) reduces cross-border traffic over a network. With reference also to FIGS. 1 and 2, method 900 includes storing 902 institution profile data associated with an institution 210 in a database 120, wherein the institution profile data identifies institution account data, a batch receiver 226, and a batch receiver country associated with batch receiver 226, and wherein the batch receiver country differs from an institution country associated with the institution account data. Method 900 also includes storing 904 user profile data in database 120 for a plurality of users 222 associated with institution 210 in the institution country, wherein the user profile data identifies a plurality of recipients 236 and, for each of recipients 236, a recipient bank, a recipient account, an individual transfer amount from one of users 222, and a recipient country, wherein the recipient country differs from the institution country. Method 900 further includes generating 906, based on the user profile data in database 120, sets of transfer data, wherein each of the sets of transfer data identifies one of recipients 236, the associated recipient country of recipient 236, and the associated individual transfer amount from the one of users 222. Method 900 also includes aggregating 908 the individual transfer amounts of a subset of the sets of transfer data into a batch transfer amount, wherein the sets of transfer data in the subset include the recipient country matching the batch receiver country.

Method 900 further includes transferring 910, via a payment processing network 228 associated with convertor computing device 150, the batch transfer amount from an institution account identified by the institution account data to batch receiver 226. Method 900 also includes generating 912 an instruction data file that instructs batch receiver 226 to distribute the individual transfer amounts associated with the subset to the associated recipients 236, wherein each of the distributions is instructed to occur within the matching batch receiver country. Method 900 further includes transmitting 914 the instruction data file to batch receiver 226.

Figure 10:
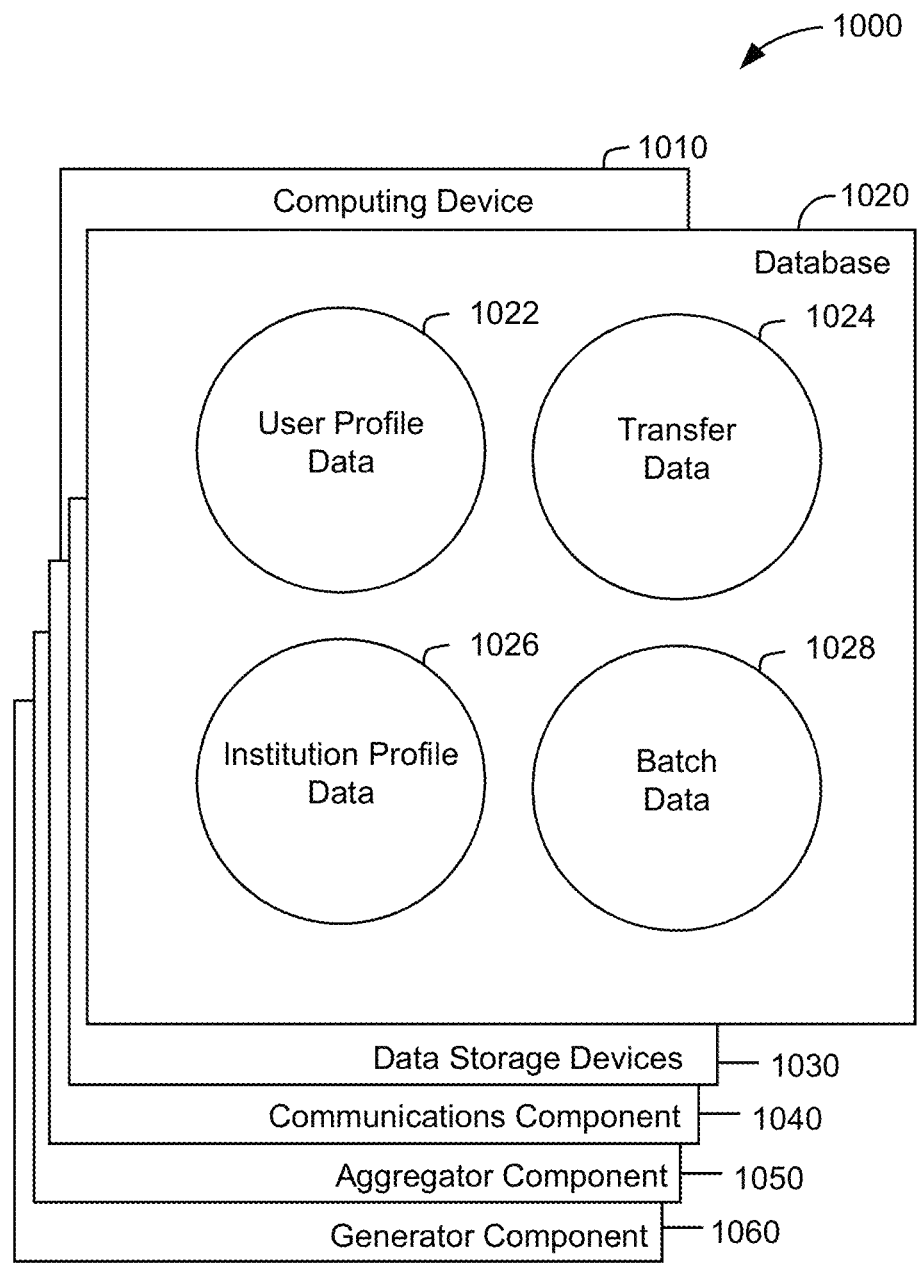

FIG. 10 is a diagram 1000 of components of one or more example computing devices that may be used in convertor system 100 shown in FIG. 1. In some embodiments, computing device 1010 is used to implement convertor computing device 150 (shown in FIG. 1). Database 1020 may be coupled with several separate components within computing device 1010, which perform specific tasks. In some embodiments, database 1020 is used to implement database 120 (shown in FIG. 1). In this embodiment, database 1020 includes user profile data 1022 and institution profile data 1026. Database 1020 may also include transfer data 1024 generated from user profile data 1022 and batch data 1028 generated from institution profile data 1026.

Computing device 1010 includes database 1020, as well as data storage devices 1030 for storing data within database 1020, such as storing 902 (shown in FIG. 9) institution profile data 1026 and storing 904 (shown in FIG. 9) user profile data 1022. Computing device 1010 further includes a communications component 1040 for transferring 910 (shown in FIG. 9), via a payment processing network 228 (shown in FIG. 2) associated with convertor computing device 150, a batch transfer amount from an institution account identified by institution account data to batch receiver 226 (shown in FIG. 2), and transmitting 914 (shown in FIG. 9) the instruction data file to batch receiver 226.

Computing device 1010 also includes an aggregator component 1050 for aggregating 908 (shown in FIG. 9) the individual transfer amounts of a subset of a sets of transfer data into a batch transfer amount. Computing device 1010 further includes a generator component 1060 for generating 906 (shown in FIG. 9), based on a user profile data in database 120, sets of transfer data, and generating 912 an instruction data file that instructs batch receiver 226 to distribute the individual transfer amounts associated with the subset to the associated recipients 236 (shown in FIG. 10).

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the data aggregator (DA) computing device are described herein as including general processing and memory devices, it should be understood that the DA computing device is a specialized computer configured to perform the steps described herein for aggregating, exchanging, and filtering data over a communications network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A convertor computing device comprising at least one processor communicatively coupled to a database and operable to reduce messaging traffic over a network, the at least one processor configured to:
   store entity profile data associated with an entity in the database, wherein the entity profile data includes entity account data, batch receiver account data associated with a batch receiver account of a batch receiver, and batch receiver country data associated with a batch receiver country in which the batch receiver account is located, wherein the batch receiver country data differs from entity country data associated with the entity account data, and wherein the entity account data is associated with an originating country;
   store user profile data in the database for a plurality of users associated with the entity, wherein the user profile data identifies a plurality of recipients and, for each of the recipients, includes recipient bank data, recipient account data associated with a recipient account, individual transfer amount data associated with an individual transfer amount from one of the users, and recipient country data associated with a recipient country, wherein the recipient country data differs from the entity country data, and wherein the recipient country differs from the originating country;
   generate, based on the user profile data in the database, sets of transfer data, wherein each of the sets of transfer data identifies each of the recipients using a corresponding unique recipient identifier, the associated recipient country data of each recipient, and the associated individual transfer amount data from the one of the users;
   assign a unique transfer identifier to each set of transfer data;
   match the associated recipient country data of each set of transfer data to the batch receiver country data;
   aggregate, based on the matching, the individual transfer amount data of a subset of the sets of transfer data into a batch amount data associated with a batch transfer amount, wherein the subset of the sets of transfer data includes the associated recipient country data matching the batch receiver country data, and wherein the subset of the sets includes two or more of the unique recipient identifiers, each associated with each recipient;
   generate a single electronic message comprising the subset of the sets of transfer data and the batch amount data, wherein the subset of the sets of transfer data includes the unique transfer identifiers associated with each of the subset of the sets of transfer data, each of the unique transfer identifiers enabling at least one client computing device associated with the batch receiver account to unbundle the batch transfer amount after transferring the single electronic message to the recipient country;
   cause, using the single electronic message, transfer, based on the matching of the associated recipient country data of each set of transfer data to the batch receiver country data and via a payment processing network associated with the convertor computing device, of the batch amount data from an entity account identified by the entity account data associated with the originating country to the batch receiver account associated with the recipient country;
   match the associated recipient country data of each set of transfer data to the batch receiver country data;
   generate an instruction data file that electronically instructs an automatic disbursement of the individual transfer amounts associated with the individual transfer amount data from the batch receiver account to the recipient accounts of the associated recipients, wherein each of the disbursements is instructed to occur within a border of the matching batch receiver country;
   cause, using the instruction data file, the at least one client computing device associated with the batch receiver account to unbundle the batch transfer amount associated with the transferred batch amount data, using the unique transfer identifier and each unique recipient identifier, within the border of the matching batch receiver country, such that each individual transfer amount of the batch transfer amount is disbursed from the batch receiver to each corresponding recipient account; and cause a graphical user interface including a transfer summary screen to be displayed on a client computing device of each of the users included in the single electronic message showing the individual transfer amount for the associated user from the unbundled batch transfer amount.

2. The convertor computing device of claim 1, wherein the entity is an employer, wherein the users are employees of the employer, and wherein the at least one processor is further configured to instruct at least one entity computing device associated with the entity to withhold the individual transfer amounts from paychecks of the users.

3. The convertor computing device of claim 1, wherein the user profile data further includes user account data identifying user accounts of the users in the entity country, and wherein the at least one processor is further configured to initiate a transfer of the individual transfer amounts from the respective user accounts to the entity account via the payment processing network.

4. The convertor computing device of claim 1, wherein the user profile data further includes time data identifying a remittance timing associated with each individual transfer amount, and wherein the at least one processor is further configured to:

compare a current date to the time data identified for each recipient in the user profile data; and generate the sets of transfer data only for recipients having the current date satisfying the associated time data.

5. The convertor computing device of claim 1, wherein the batch receiver includes a plurality of batch receivers associated with a plurality of batch receiver countries, wherein the subset is a plurality of subsets, wherein the instruction data file is a plurality of instruction data files, and wherein the at least one processor is further configured to:

aggregate the individual transfer amounts of each subset of the plurality of subsets into a respective batch transfer amount, wherein the sets of transfer data in each subset include the recipient country matching a corresponding one of the batch receiver countries;

transfer, via the payment processing network, the respective batch transfer amounts from the entity account to a plurality of batch receiver accounts, each associated with the corresponding batch receivers in each of the batch receiver countries;

generate the plurality of instruction data files, wherein each of the instruction data files instructs at least one computing device associated with the corresponding batch receivers to distribute the individual transfer amounts associated with the respective subset to the associated recipient accounts, wherein each of the distributions for each subset is instructed to occur within the respective matching batch receiver country; and transmit the instruction data files to the at least one computing device associated with the corresponding batch receivers.

6. The convertor computing device of claim 1, wherein the batch receiver includes a plurality of batch receivers associated with a common batch receiver country, wherein each of the plurality of batch receivers includes at least one batch receiver account, wherein the subset is a plurality of subsets, wherein the instruction data file is a plurality of instruction data files, and wherein the at least one processor is further configured to:

aggregate the individual transfer amounts of each subset of the plurality of subsets into a respective batch transfer amount, wherein the sets of transfer data in each subset share a common parameter, and wherein the common parameter is at least one of the recipient bank or the recipient;

transfer, via the payment processing network, the respective batch transfer amounts from the entity account to a corresponding one of the at least one batch receiver account associated with the batch receivers having the respective common parameter;

generate the plurality of instruction data files, wherein each of the instruction data files instructs at least one computing device associated with the corresponding batch receiver to distribute the individual transfer amounts associated with the respective subset to the associated recipients, wherein each of the distributions for each subset is instructed to occur within the common batch receiver country; and transmit each of the instruction data files to the at least one computing device associated with the corresponding batch receiver.

7. The convertor computing device of claim 1, wherein the at least one processor is further configured to:

receive, from a first client system, the entity profile data submitted by the entity for storage in the database;

in response to receiving the entity profile data, provide a graphical user interface for display on at least one second client system; and receive the user profile data via the graphical user interface for storage in the database.

8. A computer-implemented method for reducing cross-border traffic over a network, the method implemented by a convertor computing device including at least one processor in communication with a database, said method comprising:

storing entity profile data associated with an entity in the database, wherein the entity profile data includes entity account data, batch receiver account data associated with a batch receiver account of a batch receiver, and batch receiver country data associated with a batch receiver country in which the batch receiver account is located, wherein the batch receiver country data differs from entity country data associated with the entity account data, and wherein the entity account data is associated with an originating country;

storing user profile data in the database for a plurality of users associated with the entity, wherein the user profile data identifies a plurality of recipients and, for each of the recipients, includes recipient bank data, recipient account data associated with a recipient account, individual transfer amount data associated with an individual transfer amount from one of the users, and recipient country data associated with a recipient country, wherein the recipient country data differs from the entity country data, and wherein the recipient country differs from the originating country;

generating, based on the user profile data in the database, sets of transfer data, wherein each of the sets of transfer data identifies each of the recipients using a corresponding unique recipient identifier, the associated recipient country data of each recipient, and the associated individual transfer amount data from the one of the users;

assigning a unique transfer identifier to each set of transfer data;

matching the associated recipient country data of each set of transfer data to the batch receiver country data;

aggregating, based on the matching, the individual transfer amount data of a subset of the sets of transfer data into a batch amount data associated with a batch transfer amount, wherein the subset of the sets of transfer data includes the associated recipient country data matching the batch receiver country data, and wherein the subset of the sets includes two or more of the unique recipient identifiers, each associated with each recipient;

generating a single electronic message including the subset of the sets of transfer data and the batch amount data, wherein the subset of the sets of transfer data includes the unique transfer identifiers associated with each of the subset of the sets of transfer data, each of the unique transfer identifiers enabling at least one client computing device associated with the batch receiver account to unbundle the batch transfer amount after transferring the single electronic message to the recipient country;

causing, using the single electronic message, transfer, based on the matching of the associated recipient country data of each set of transfer data to the batch receiver country data and via a payment processing network associated with the convertor computing device, of the batch amount data from an entity account identified by the entity account data associated with the originating country to the batch receiver account associated with the recipient country;

generating an instruction data file that electronically instructs an automatic disbursement of the individual transfer amounts associated with the individual transfer amount data from the batch receiver account to the recipient accounts of the associated recipients, wherein each of the disbursements is instructed to occur within a border of the matching batch receiver country;

causing, using the instruction data file, the at least one client computing device associated with the batch receiver account to unbundle the batch transfer amount associated with the transferred batch amount data, using the unique transfer identifier and each unique recipient identifier, within the border of the matching batch receiver country, such that each individual transfer amount of the batch transfer amount is disbursed from the batch receiver to each corresponding recipient account; and causing a graphical user interface including a transfer summary screen to be displayed on a client computing device of each of the users included in the single electronic message showing the individual transfer amount for the associated user from the unbundled batch transfer amount.

9. The method of claim 8, wherein the entity is an employer, wherein the users are employees of the employer, and wherein the method further comprises instructing at least one entity computing device associated with the entity to withhold the individual transfer amounts from paychecks of the users.

10. The method of claim 8, wherein the user profile data further includes user account data identifying user accounts of the users in the entity country, and wherein the method further comprises initiating a transfer of the individual transfer amounts from the respective user accounts to the entity account via the payment processing network.

11. The method of claim 8, wherein the user profile data further includes time data identifying a remittance timing associated with each individual transfer amount, and wherein the method further comprises:

comparing a current date to the time data identified for each recipient in the user profile data; and generating the sets of transfer data only for recipients having the current date satisfying the associated time data.

12. The method of claim 8, wherein the batch receiver includes a plurality of batch receivers associated with a plurality of batch receiver countries, wherein the subset is a plurality of subsets, wherein the instruction data file is a plurality of instruction data files, and wherein the method further comprises:

aggregating the individual transfer amounts of each subset of the plurality of subsets into a respective batch transfer amount, wherein the sets of transfer data in each subset include the recipient country matching a corresponding one of the batch receiver countries;

transferring, via the payment processing network, the respective batch transfer amounts from the entity account to a plurality of batch receiver accounts, each associated with the corresponding batch receivers in each of the batch receiver countries;

generating the plurality of instruction data files, wherein each of the instruction data files instructs at least one computing device associated with the corresponding batch receivers to distribute the individual transfer amounts associated with the respective subset to the associated recipient accounts, wherein each of the distributions for each subset is instructed to occur within the respective matching batch receiver country; and transmitting the instruction data files to the at least one computing device associated with the corresponding batch receivers.

13. The method of claim 8, wherein the batch receiver includes a plurality of batch receivers associated with a common batch receiver country, wherein each of the plurality of batch receivers includes at least one batch receiver account, wherein the subset is a plurality of subsets, wherein the instruction data file is a plurality of instruction data files, and wherein the method further comprises:

aggregating the individual transfer amounts of each subset of the plurality of subsets into a respective batch transfer amount, wherein the sets of transfer data in each subset share a common parameter, and wherein the common parameter is at least one of the recipient bank or the recipient;

transferring, via the payment processing network, the respective batch transfer amounts from the entity account to a corresponding one of the at least one batch receiver account associated with the batch receivers having the respective common parameter;

generating the plurality of instruction data files, wherein each of the instruction data files instructs at least one computing device associated with the corresponding batch receiver to distribute the individual transfer amounts associated with the respective subset to the associated recipients, wherein each of the distributions for each subset is instructed to occur within the common batch receiver country; and transmitting each of the instruction data files to the at least one computing device associated with the corresponding batch receiver.

14. The method of claim 8 further comprising:
receiving, from a first client system, the entity profile data submitted by the entity for storage in the database;
in response to receiving the entity profile data, providing a graphical user interface for display on at least one second client system; and
receiving the user profile data via the graphical user interface for storage in the database.

15. A non-transitory computer-readable storage medium having computer-executable instructions embodied thereon, wherein when executed by a convertor computing device including at least one processor in communication with a database, the computer-executable instructions cause the at least one processor to:
store entity profile data associated with an entity in the database, wherein the entity profile data includes entity account data, batch receiver account data associated with a batch receiver account of a batch receiver, and batch receiver country data associated with a batch receiver country in which the batch receiver account is located, wherein the batch receiver country data differs from entity country data associated with the entity account data, and wherein the entity account data is associated with an originating country;
store user profile data in the database for a plurality of users associated with the entity, wherein the user profile data identifies a plurality of recipients and, for each of the recipients, includes recipient bank data, recipient account data associated with a recipient account, individual transfer amount data associated with an individual transfer amount from one of the users, and recipient country data associated with a recipient country, wherein the recipient country data differs from the entity country data, and wherein the recipient country differs from the originating country;
generate, based on the user profile data in the database, sets of transfer data, wherein each of the sets of transfer data identifies each of the recipients using a corresponding unique recipient identifier, the associated recipient country data of each recipient, and the associated individual transfer amount data from the one of the users;
assign a unique transfer identifier to each set of transfer data;
match the associated recipient country data of each set of transfer data to the batch receiver country data;
aggregate, based on the matching, the individual transfer amount data of a subset of the sets of transfer data into a batch amount data associated with a batch transfer amount, wherein the subset of the sets of transfer data includes the associated recipient country data matching the batch receiver country data, and wherein the subset of the sets includes two or more of the unique recipient identifiers, each associated with each recipient;
generate a single electronic message including the subset of the sets of transfer data and the batch amount data, wherein the subset of the sets of transfer data includes the unique transfer identifiers associated with each of the subset of the sets of transfer data, each of the unique transfer identifiers enabling at least one client computing device associated with the batch receiver account to unbundle the batch transfer amount after transferring the single electronic message to the recipient country;
cause, using the single electronic message, transfer, based on the matching of the associated recipient country data of each set of transfer data to the batch receiver country data and via a payment processing network associated with the convertor computing device, of the batch amount data from an entity account identified by the entity account data associated with the originating country to the batch receiver account associated with the recipient country;
generate an instruction data file that electronically instructs an automatic disbursement of the individual transfer amounts associated with the individual transfer amount data from the batch receiver account to the recipient accounts of the associated recipients, wherein each of the disbursements is instructed to occur within a border of the matching batch receiver country;
cause, using the instruction data file, the at least one client computing device associated with the batch receiver account to unbundle the batch transfer amount associated with the transferred batch amount data, using the unique transfer identifier and each unique recipient identifier, within border of the matching batch receiver country, such that each individual transfer amount of the batch transfer amount is disbursed from the batch receiver to each corresponding recipient account; and
cause a graphical user interface including a transfer summary screen to be displayed on a client computing device of each of the users included in the single electronic message showing the individual transfer amount for the associated user from the unbundled batch transfer amount.

16. The non-transitory computer-readable storage medium of claim 15, wherein the entity is an employer, wherein the users are employees of the employer, and wherein the computer-executable instructions further cause the at least one processor to instruct at least one entity computing device associated with the entity to withhold the individual transfer amounts from paychecks of the users.

17. The non-transitory computer-readable storage medium of claim 15, wherein the user profile data further includes user account data identifying user accounts of the users in the entity country, and wherein the computer-executable instructions further cause the at least one processor to initiate a transfer of the individual transfer amounts from the respective user accounts to the entity account via the payment processing network.

18. The non-transitory computer-readable storage medium of claim 15, wherein the user profile data further includes time data identifying a remittance timing associated with each individual transfer amount, and wherein the computer-executable instructions further cause the at least one processor to:
compare a current date to the time data identified for each recipient in the user profile data; and
generate the sets of transfer data only for recipients having the current date satisfying the associated time data.

19. The non-transitory computer-readable storage medium of claim 15, wherein the batch receiver includes a plurality of batch receivers associated with a plurality of batch receiver countries, wherein the subset is a plurality of subsets, wherein the instruction data file is a plurality of instruction data files, and wherein the computer-executable instructions further cause the at least one processor to:
aggregate the individual transfer amounts of each subset of the plurality of subsets into a respective batch transfer amount, wherein the sets of transfer data in each subset include the recipient country matching a corresponding one of the batch receiver countries;

transfer, via the payment processing network, the respective batch transfer amounts from the entity account to a plurality of batch receiver accounts, each associated with the corresponding batch receivers in each of the batch receiver countries;

generate the plurality of instruction data files, wherein each of the instruction data files instructs at least one computing device associated with the corresponding batch receivers to distribute the individual transfer amounts associated with the respective subset to the associated recipient accounts, wherein each of the distributions for each subset is instructed to occur within the respective matching batch receiver country; and transmit the instruction data files to the at least one computing device associated with the corresponding batch receivers.

20. The non-transitory computer-readable storage medium of claim 15, wherein the batch receiver includes a plurality of batch receivers associated with a common batch receiver country, wherein each of the plurality of batch receivers includes at least one batch receiver account, wherein the subset is a plurality of subsets, wherein the instruction data file is a plurality of instruction data files, and wherein the computer-executable instructions further cause the at least one processor to:

aggregate the individual transfer amounts of each subset of the plurality of subsets into a respective batch transfer amount, wherein the sets of transfer data in each subset share a common parameter, and wherein the common parameter is at least one of the recipient bank or the recipient;

transfer, via the payment processing network, the respective batch transfer amounts from the entity account to a corresponding one of the at least one batch receiver account associated with the batch receivers having the respective common parameter;

generate the plurality of instruction data files, wherein each of the instruction data files instructs at least one computing device associated with the corresponding batch receiver to distribute the individual transfer amounts associated with the respective subset to the associated recipients, wherein each of the distributions for each subset is instructed to occur within the common batch receiver country; and transmit each of the instruction data files to the at least one computing device associated with the corresponding batch receiver.

* * * * *